US012775594B1

(12) United States Patent
Girouard

(10) Patent No.: US 12,775,594 B1
(45) Date of Patent: Oct. 27, 2026

(54) SYSTEM AND METHOD FOR DATA ANALYSIS AND OPTIMIZATION FOR RESOURCE INDEPENDENCE

(71) Applicant: Capital Asset Management Group, Inc., Washington, DC (US)

(72) Inventor: John Edward Girouard, Washington, DC (US)

(73) Assignee: Capital Asset Management Group, Inc., Washington, DC (US)

( * ) Notice: Subject to any disclaimer, the term of this patent is extended or adjusted under 35 U.S.C. 154(b) by 0 days.

(21) Appl. No.: 19/282,920

(22) Filed: Jul. 28, 2025

(51) Int. Cl.
*G06F 16/21* (2019.01)
*G06F 16/28* (2019.01)
*G06F 40/295* (2020.01)
*H04L 67/306* (2022.01)

(52) U.S. Cl.
CPC .......... *G06F 16/211* (2019.01); *G06F 16/285* (2019.01); *G06F 40/295* (2020.01); *H04L 67/306* (2013.01)

(58) Field of Classification Search
CPC .... G06F 16/211; G06F 16/285; G06F 40/295; H04L 67/306
USPC .......................................................... 707/803
See application file for complete search history.

(56) References Cited

U.S. PATENT DOCUMENTS 6,271,892 B1 * 8/2001 Gibbon ................ H04N 19/179 348/700
7,640,200 B2 12/2009 Gardner et al.
8,620,785 B1 12/2013 Wilks et al.
11,574,074 B2 * 2/2023 Koduri .............. G06F 16/24578
2006/0178918 A1 * 8/2006 Mikurak ................ G06Q 10/06 705/7.31
2008/0168420 A1 * 7/2008 Sabbouh ............... G06F 16/972 707/E17.117
2018/0053118 A1 * 2/2018 Kataria ................. G06F 16/951
2020/0175961 A1 * 6/2020 Thomson .............. G10L 15/063
2022/0028001 A1 1/2022 Wachell et al.
2024/0046318 A1 * 2/2024 Muriqi ............... G06Q 30/0277
2025/0225012 A1 * 7/2025 Turner ..................... G06N 3/09
2025/0225587 A1 * 7/2025 La Placa ............... H04L 67/306
2025/0265549 A1 * 8/2025 Rogynskyy .......... G06Q 10/107

FOREIGN PATENT DOCUMENTS

IN 202411014397 A 3/2024
IN 202421067529 A 10/2024

* cited by examiner

*Primary Examiner* — Kuen S Lu
(74) *Attorney, Agent, or Firm* — CALDWELL LLC

(57) ABSTRACT

A system including at least a processor, and a memory communicatively connected to the at least a processor, the memory containing instructions configuring the at least a processor to aggregate a plurality of primary data from one or more primary sources comprising one or more restricted-access sources, receive a plurality of secondary data, wherein receiving a plurality of secondary data comprises querying a user, curating, as a function of querying the user, a goal profile and a risk profile, parse the plurality of primary data into an associated category, wherein parsing the plurality of primary data into an associated category comprises fragmenting the plurality of primary data into instances, and assigning the instances to a predefined category, map the plurality of primary data to the plurality of secondary data, and generate, as a function of mapping the plurality of primary data to the plurality of secondary data, a dynamic schema.

20 Claims, 8 Drawing Sheets

200

SYSTEM AND METHOD FOR DATA ANALYSIS AND OPTIMIZATION FOR RESOURCE INDEPENDENCE

FIELD OF THE INVENTION

The present invention generally relates to the field of predictive analytics. In particular, the present invention is directed to systems and methods for data analysis and optimization for resource independence.

BACKGROUND

The increasing volume of unstructured data has driven the need for advanced methods to extract, process, and analyze textual information efficiently. Traditional systems struggle to interpret qualitative data due to its complexity, context dependence, and variability across different sources. Additionally, traditional systems frequently lack adaptability, struggling to integrate new data types or adjust to shifting patterns in unstructured text, limiting their long-term effectiveness in dynamic environments.

SUMMARY OF THE DISCLOSURE

In an aspect, a system for data analysis and optimization for resource independence may include at least a processor, and a memory communicatively connected to the at least a processor, wherein the memory contains instructions configuring the at least a processor to aggregate a plurality of primary data from one or more primary sources, wherein the one or more primary sources comprise one or more restricted access sources, receive a plurality of secondary data, wherein receiving a plurality of secondary data comprises querying a user, curating, as a function of querying the user, a goal profile and a risk profile, parse the plurality of primary data into an associated category, wherein parsing the plurality of primary data into an associated category comprises fragmenting the plurality of primary data into instances, and assigning the instances to a predefined category, map the plurality of primary data to the plurality of secondary data, and generate, as a function of mapping the plurality of primary data to the plurality of secondary data, a dynamic schema.

In another aspect, a method for data analysis and optimization for resource independence may include aggregating a plurality of primary data from one or more primary sources, wherein the one or more primary sources comprise one or more restricted access sources, receiving a plurality of secondary data, wherein receiving a plurality of secondary data comprises querying a user, curating, as a function of querying the user, a goal profile and a risk profile, parsing the plurality of primary data into an associated category, wherein parsing the plurality of primary data into an associated category comprises fragmenting the plurality of primary data into instances, and assigning the instances to a predefined category, mapping the plurality of primary data to the plurality of secondary data, and generating, as a function of mapping the plurality of primary data to the plurality of secondary data, a dynamic schema.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for data analysis and optimization for resource independence. In an embodiment, the present systems and methods herein provide an integrated financial schema focused on optimizing an individual's financial strategy through protection, savings, wealth accumulation, and asset management.

Aspects of the present disclosure can be used to provide a dynamic and integrated picture of an individual's financial strategy with a focus on risk management and goal aspirations. Aspects of the present disclosure can also be used to dynamically update an individual's financial strategy based on changes in their profile and/or market projections. This is so, at least in part, because the present systems and methods may automatically gather relevant data and generate or adjust an individual's financial strategy.

Aspects of the present disclosure allow for data analysis and optimization for resource independence. Exemplary embodiments illustrating aspects of the present disclosure are described below in the context of several specific examples.

Figure 1:
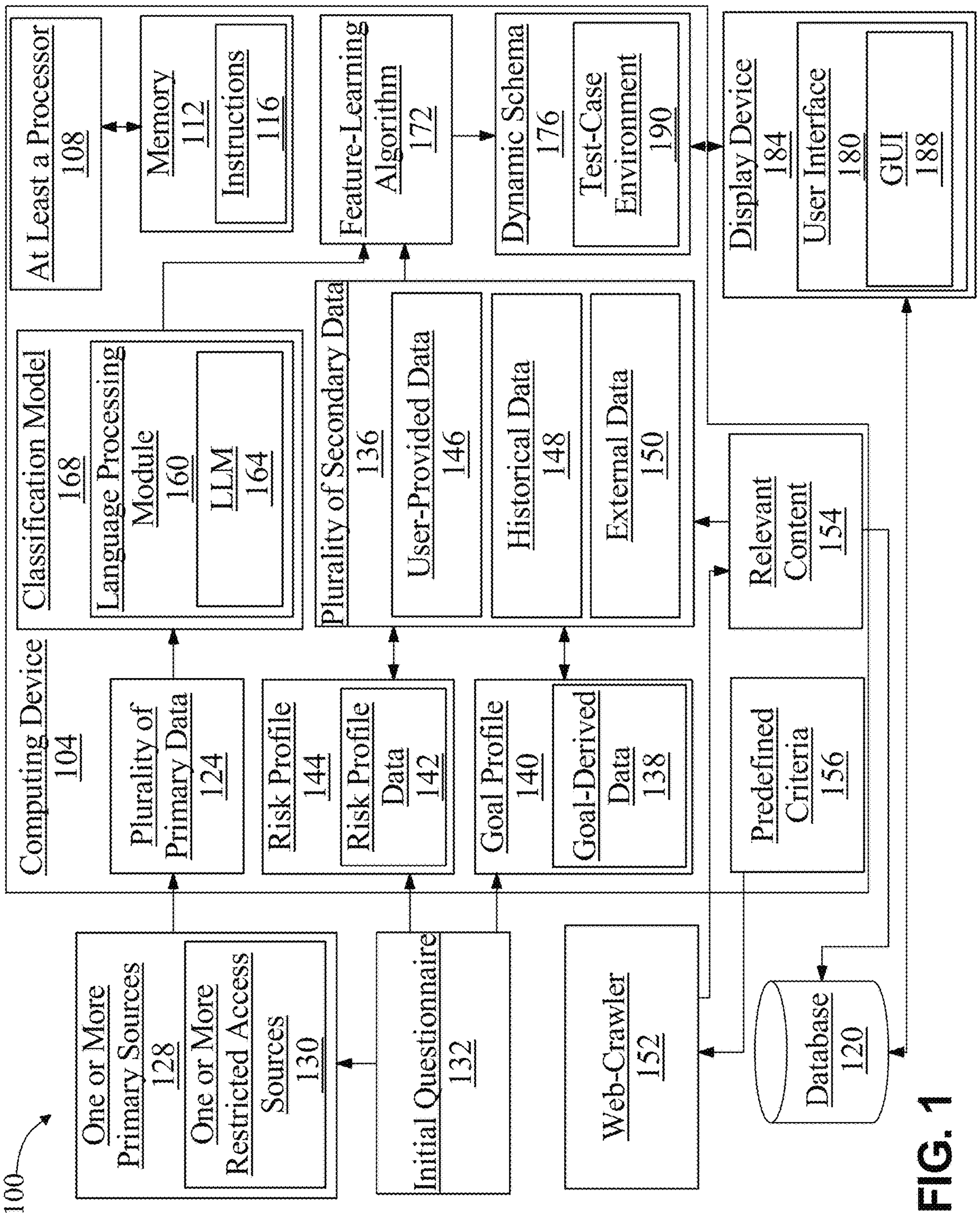
FIG. 1 is a block diagram of an exemplary system for data analysis and optimization for resource independence.

Referring now to FIG. 1, an exemplary embodiment of a system for data analysis and optimization for resource independence is illustrated. In an embodiment, system 100 may include at least a processor 108, and a memory 112 communicatively connected to the at least a processor 108, wherein the memory 112 contains instructions 116 configuring the at least a processor 108 to aggregate a plurality of primary data 124 from one or more primary sources 128, wherein the one or more primary sources 128 comprise one or more restricted access sources 130, receive a plurality of secondary data 136, wherein receiving a plurality of secondary data 136 comprises querying a user, curating, as a function of querying the user, a goal profile 140 and a risk profile 144, parse the plurality of primary data 124 into an associated category, wherein parsing the plurality of primary data 124 into an associated category comprises fragmenting the plurality of primary data 124 into instances, and assigning the instances to a predefined category, map the plurality of primary data 124 to the plurality of secondary data 136, and generate, as a function of mapping the plurality of primary data 124 to the plurality of secondary data 136, a dynamic schema 176.

In continued reference to FIG. 1, system 100 includes a computing device 104. Computing device 104 includes a processor communicatively connected to memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions 116 and/or information may be transmitted to primary memory wherein information may be processed. In one or more embodiments, information may only be populated within primary memory while a particular software is running. In one or more embodiments, information within primary memory is wiped and/or removed after the computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor 108. In one or more embodiments, data is transferred from secondary to primary memory wherein processor 108 may access the information from primary memory.

Still referring to FIG. 1, system 100 may include a database 120. The database 120 may include a remote database. The database 120 may be implemented, without limitation, as a relational database, a key-value retrieval database such as a NOSQL database, or any other format or structure for use as database that a person skilled in the art would recognize as suitable upon review of the entirety of this disclosure. The database 120 may alternatively or additionally be implemented using a distributed data storage protocol and/or data structure, such as a distributed hash table or the like. The database 120 may include a plurality of data entries and/or records as described above. Data entries in database 120 may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database 120 may store, retrieve, organize, and/or reflect data and/or records.

With continued reference to FIG. 1, system 100 may include and/or be communicatively connected to a server, such as but not limited to, a remote server, a cloud server, a network server and the like. In one or more embodiments, the computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device 104. In one or more embodiments, server may be configured to perform one or more processes as described below to allow for increased computational power and/or decreased power usage by the system 100. In one or more embodiments, computing device 104 may transmit processes to server wherein computing device 104 may conserve power or energy.

Further referring to FIG. 1, computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing devices operating in concert, in parallel, sequentially or the like; two or more computing devices may be included together in a single computing device or in two or more computing devices. Computing device 104 may interface or communicate with one or more additional devices as described below in further detail via a network interface device. Network interface devices may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory between computing devices. computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In further reference to FIG. 1, in an embodiment, at least a processor 108 may be configured to aggregate a plurality of primary data 124 from one or more primary sources 128, wherein one or more primary sources 128 include one or more restricted access sources 130. For purposes of this disclosure, a plurality of "primary data" refers to financial information. For example, plurality of primary data 124 may include, without limitation, transaction data, account data, investment data, financial statements, payment data, tax data, and/or any other relevant financial data. Plurality of primary data 124 may include raw data and/or processed data. For example, plurality of primary data 124 may include raw data such as transaction data, which may include records of individual financial transactions such as sales, purchases, payments, and transfers. Further, processed data may include performance metrics, wherein performance metrics aggregate account transactions and generate a performance metric representing the performance of the aggregated account transactions.

Continuing to reference FIG. 1, in an embodiment, plurality of primary data 124 may be sourced from one or more primary sources 128. One or more "primary sources," as used herein, refers to the systems, entities, or locations from which primary financial data is collected or generated. For example, this may include, without limitation, accounting systems, banking systems, payment processors, investment portfolios, tax reporting systems, Enterprise Resource Planning (ERP) systems, government databases, invoices and receipts, and/or other relevant financial sources. In an embodiment, one or more primary sources 128 may include one or more restricted access sources 130.

With further reference to FIG. 1, as used herein, one or more "restricted access sources" refers to a data source or system that limits or controls who can access its data. Access to one or more restricted access sources 130 may be governed by specific permissions, credentials, and/or requirements to ensure that only authorized users and/or entities may retrieve and/or interact with the data. For example, and without limitation, one or more restricted access sources 130 may include banking systems and/or accounts, private investment portfolios, government and/or regulatory databases, employee payroll systems, credit reports and scores, and/or ERP systems. In an embodiment, prior to receiving plurality of primary data 124, system 100 may be required to obtain permissions for one or more restricted access sources 130. This may be accomplished through various formal processes, often with a focus on verifying the legitimacy, need, and/or authorization of an individual and/or entity seeking access.

In further reference to FIG. 1, in an embodiment, obtaining permissions for one or more restricted access sources 130 may include obtaining authorization through consent and/or legal approval. For systems, such as system 100, dealing with sensitive data, such as financial data and/or personal data, legal and/or regulatory frameworks may require explicit authorization and/or consent from the data owner and/or a governing body before access may be granted. This process may include, for example, requesting formal consent from the data owner and/or proving compliance with applicable regulations, such as Sarbanes-Oxley (SOX) and/or the like. Such an embodiment may be used by a user that is not the data owner, for example, a financial associate. For purposes of this disclosure, a "financial associate" is an individual who works in the financial sector or a finance-related role. This may be applied in instances wherein a financial associate is using system 100 to provide financial advice to a client. In such a case, the client may not have direct access to system 100, but indirect access through the financial associate. Further, in some cases, system 100 may not require direct access to one or more primary sources 128. For example, plurality of primary data 124 associated with one or more primary sources 128 may be provided by a client to enter into system 100.

With continued reference to FIG. 1, in an embodiment, obtaining permissions for one or more restricted access sources 130 may include accessing plurality of primary data 124 through an application programming interface (API). For purposes of this disclosure, an "API" is a set of rules and protocols that allow different software applications to communicate with each other. This option may be used when accessing financial data from a third-party service and/or when integrating with a restricted database. In an embodiment, accessing a plurality of primary data 124 through an API may include applying for an API key and/or requesting access tokens from the service provider. Further, an application providing the purpose of accessing the data and how it will be used may be required. Once granted, the API provider may provide secure means to authenticate and use the API, often with limited access based on an authorization level.

Further referring to FIG. 1, in an embodiment, at least a processor 108 may be configured to provide an initial questionnaire 132 to a user, wherein the initial questionnaire 132 inquires into the existence of one or more primary sources 128 related to a client. In an embodiment, the purpose of the initial questionnaire 132 may include gathering information related to the client and their current financial situation. The initial questionnaire 132 may inform system 100 of a starting point that may be built upon using personalized financial strategies. A user's answers to the initial questionnaire 132 may be stored at database 120, which may be local and/or remote.

In continued reference to FIG. 1, in an embodiment, at least a processor 108 may be configured to receive a plurality of secondary data 136, wherein receiving a plurality of secondary data 136 includes querying a user, curating, as a function of querying the user, a goal profile 140 and a risk profile 144. For purposes of this disclosure, a plurality of "secondary data" refers to data that provides context and a framework for achieving financial objectives, managing risks, or guiding strategic decisions. For example, and without limitation, plurality of secondary data 136 may include goal-derived data 138 and/or risk profile data 142. "Goal-derived data," as used herein, refers to information about the objectives or desired outcomes of an individual or organization. For example, in personal finance, goal-derived data 138 may include financial objectives such as saving for retirement, purchasing a home, and/or funding a child's education. In an embodiment, goal-derived data 138 may be integrated to generate a goal profile 140. A "goal profile," as used herein, refers to a comprehensive representation of an individual's or organizations financial or personal goals. The goal profile 140 may be one of many guides for decision-making, planning, and/or strategy. In an embodiment, a goal profile 140 may capture the specific objectives an individual and/or organization aims to achieve over a defined period of time, and may include details such as the nature, priority, and/or timeline of those goals. In one or more embodiments, goal profile 140 may help align actions and resources with a desired outcome.

In further reference to FIG. 1, as used throughout this disclosure, "risk profile data" refers to information about the level of risk an individual or organization is willing or able to take on. For example, this may include, without limitation, an individual's willingness to invest in high-risk assets and/or how much financial risk they are comfortable. In an embodiment, the risk profile data 142 may be integrated to generate a risk profile 144. A "risk profile," as used herein, refers to an assessment of an individual's or organization's willingness and ability to take on risk. In an embodiment, a risk profile 144 may be used to determine how much risk a person or entity is comfortable with, as well as how much risk they can afford to take based on their financial situation, objectives, and personal preferences. A risk profile 144 may include, without limitation, factors such as risk tolerance, financial capacity, and/or time horizon.

With further reference to FIG. 1, in an embodiment, plurality of secondary data 136 may include one or more of user-provided data 146, historical data 148, and/or external data 150. For purposes of this disclosure, "user-provided data" refers to information or input supplied by a user. This may include, without limitation, data obtained through one or more questionnaires. In an embodiment, one or more questionnaires may include the initial questionnaire 132. In some embodiments, the one or more questionnaires may encompass a single questionnaire presented to a user. Alternatively, and/or additionally, separate questionnaires may be allocated for each category of user-provided data 146. For example, these categories may include a primary source questionnaire, a goal questionnaire, a risk profile 144 questionnaire, and/or other related questionnaires.

In continued reference to FIG. 1, as used herein, "historical data" refers to data that has been collected and recorded over a period of time. For example, historical data 148 may include data representing past events, activities, and/or behaviors. In an embodiment, historical data 148 may be used to analyze trends, identify patterns, and/or make predictions and/or informed decisions based on past performance and/or occurrences. In an embodiment, historical data 148 may be stored at a database 120 or data repository. Further, in some embodiments, historical data 148 may be analyzed by a machine-learning model. In such an embodiment the machine-learning model may process historical data 148 and output a comprehensive client profile. Wherein the client profile represents a predicted goal profile and a predicted risk profile. This may provide a starting point for querying a user. Further, in some cases, the predicted goal profile and the predicted risk profile may be compared to a curated goal profile 140 and risk profile 144 following one or more questionnaires and the variations may be used to retrain the machine-learning model. In an embodiment, the machine-learning model may be trained using exemplary historical data correlated to exemplary goal profiles and exemplary risk profiles. In an embodiment, at least a processor 108 may track variations in the client profile over time which may inform a user of their financial path over a period of time, which may inform future strategies and/or goals.

With further reference to FIG. 1, "external data," as used throughout this disclosure, refers to information that originates outside of one or more primary sources 128. External data 150 may originate from third-party sources and may be used to compliment and/or enrich plurality of primary data 124 to improve decision-making, analysis, and/or operations. External data 150 in some cases may include data related to understanding the financial environment in which a client exists, including factors such as market trends, industry performance, economic conditions, and/or the like. Further, in an embodiment, external data 150 may include structured data, such as financial reports and/or databases, and/or unstructured data, such as social media posts, news articles, and/or the like.

In an embodiment, the external data 150 may be received as a function of a web-crawler 152, wherein the web-crawler 152 is configured to access one or more data sources, identify relevant content 154 as a function of a predefined criteria, extract the relevant content 154, parse the relevant content 154 into a uniform format, store the relevant content 154 in a database 120, and continuously monitor the one or more data sources. For purposes of this disclosure, a "web-crawler," also known as a spider or web bot, is an automated program or script that systematically browses the internet, accessing websites and web pages to gather data. In an embodiment, the primary function of web-crawler 152 is to index content from the web and make it accessible to system 100. In an embodiment, web-crawler 152 may navigate from one webpage to another by following links on the pages it visits. It may, for example, start from a list of URLs, called seeds, and explore other pages by recursively following the links. Further, in an embodiment, web-crawler 152 may collect data from the visited web pages, such as text, images, metadata, and/or links. This information may then be stored in a database 120 and/or an index, making it searchable and retrievable for various purposes. In an embodiment, web-crawler 152 may gather various types of content, including text, images, video links, and/or other media types found on web pages. This data may be used for analysis, aggregation, and/or display.

With continued reference to FIG. 1, in an embodiment, the one or more data sources may be related to the goal profile 140 and/or the risk profile 144. This may, for example, include data sources that convey data such as external market data, and/or the like. As used herein, "external market data," refers to information about market conditions, trends, and economic factors. For example, external market data may include economic forecasts, market trends, financial predictions that help assess the feasibility of achieving certain goals, asset performance, and/or the like. In an embodiment, data sources related to goal profile 140 and risk profile 144 may, in some cases, include social media accounts. Wherein data from social media accounts may aid in developing the goal profile 140 based on current and historical engagement. Additionally, in some cases, data derived from social media platforms may additionally inform future investments to align with a user's preferences and/or interests.

In further reference to FIG. 1, as used herein, "relevant content" refers to information, data, or material that is directly applicable or important to a specific topic, context, or objective. Herein, relevant content 154 may include content related to financial metrics, goal alignment, market sentiment, and/or the like. In an embodiment, predefined criteria 156 may include keywords, phrases, and/or specific financial metrics that are indicative of potential risks, goal alignment, and/or shifts in market sentiment. For purposes of this disclosure, "predefined criteria" are specific parameters or factors that have been set up in advance to help guide automated analysis, data collection, and decision-making processes. In an embodiment, these predefined criteria 156 may be based on the goals of system 100, which may include assessing market risks, aligning financial actions with specific goals, and/or detecting shifts in market sentiment. Keywords and phrases may refer to specific words or groups of words that are critical in identifying relevant information in data sources. In establishing these keywords and phrases as part of the predefined criteria 156, system 100 may automatically scan large volumes of text for relevant information and identify patterns and/or signals in the text that may indicate potential risks, shifts, in market sentiment, and/or alignment with a given goal. For example, and without limitation, key words for risk may include terms such as "default," "bankruptcy," "volatility," "liquidation," and/or "downturn." Further, key words for goal alignment may include, without limitation, "retirement savings," "long-term investment," "savings target," and/or "asset growth." Keywords and/or phrases for market sentiment may include, without limitation, "optimistic," "bearish," "bullish," "uncertainty," and/or "crisis." In some cases, predefined criteria 156 may require that certain keywords or phrases exist in the same source prior to scraping data from said source.

In an embodiment, identifying relevant content as a function of a predefined criteria may include assigning a relevance score to individual content using a weighted formula, setting a threshold score to filter out low-relevance content, and ranking the scored individual content as a function of the relevance score. The process of identifying relevant content as a function of a predefined criteria may begin with assigning a relevance score to individual content, which quantifies how well a particular piece of content aligns with predefined criteria. In an embodiment, these criteria may include keyword frequency, semantic context, sentiment polarity, financial metric significance, and/or contextual importance within the domain of interest. At least a processor 108 may employ a weighted formula to calculate the relevance score, where different factors contribute varying degrees of importance based on their predictive value. For instance, direct mentions of a financial risk factor, such as "market volatility," might carry greater weight than general economic discussions.

In continued reference to FIG. 1, once relevance scores are assigned, at least a processor 108 may apply a threshold score to filter out content that falls below a predefined minimum level of significance. This may prevent irrelevant, redundant, or low-quality data from being considered in downstream analysis. In an embodiment, the threshold may be static, meaning it remains fixed over time, or dynamic, where it adjusts based on factors such as the volume of incoming data, market conditions, and/or user-defined preferences. For example, in times of high financial uncertainty, the system may lower the threshold to ensure a broader pool of potentially relevant content is analyzed, whereas during periods of stability, a higher threshold may be used to focus only on the most critical information.

With further reference to FIG. 1, in an embodiment, after filtering out low-relevance content, at least a processor 108 may rank the remaining content based on the assigned relevance scores. Ranking may ensure that the most valuable insights are prioritized for review, analysis, or automated decision-making. In an embodiment, the ranking process may incorporate contextual adjustments that refine the order of importance. For example, if two articles have similar relevance scores but one originates from a highly trusted financial institution while the other is from an unknown source, the system may boost the ranking of the trusted source. Additionally, ranking may consider recency, corroborating evidence, and anomaly detection, ensuring that new, validated, or unexpected insights receive appropriate weighting.

By assigning weighted relevance scores, filtering out low-relevance content, and ranking meaningful insights, this approach may enable efficient content prioritization, ensuring that only the most critical and informative data is surfaced for further analysis or decision-making. This methodology is particularly valuable in applications such as financial risk monitoring, market trend analysis, regulatory compliance tracking, and investment decision support systems, where rapid identification of high-impact content is essential.

In continued reference to FIG. 1, in an embodiment, extracting the relevant content 154 may include extracting both structured and unstructured data "Structured data," as used herein is information that is organized and stored in a predefined format. In some cases, it may include data that is numerical, categorical, and/or has well-defined relationships between variables. For example, structure data may include relational data, which resides in tables with rows and columns. Each piece of data may be categorized and/or easily accessible using queries. Structured data may include financial data, customer information, sales data, market metrics, and/or the like. In an embodiment, at least a processor 108 may extract structured data based on predefined parameters using queries, such as SQL queries and/or data pipelines.

Still referring to FIG. 1, for purposes of this disclosure, "unstructured data" refers to information that does not have a predefined format or organization. Unstructured data may include data that is free-form and may be in the form of text, images, audio, video, and/or social media posts. For example, unstructured data may include text, multimedia, documents, social media content, and/or the like. In an embodiment, extracting unstructured data may include using natural language processing (NLP) techniques to extract meaningful content from text. For example, NLP techniques may include entity recognition, sentiment analysis, and/or topic modeling. In some embodiments, at least a processor 108 may implement computer vision to extract data from images and/or video using algorithms that detect objects, text, and/or faces.

With further reference to FIG. 1, in an embodiment, parsing the relevant content 154 may include converting qualitative data into quantifiable metrics and ensuring consistent structuring of quantitative data. For purposes of this disclosure, "qualitative data" is descriptive, non-numeric data. For example, qualitative data may include text, images, audio, and/or video. In some cases, qualitative data may include subjective information, opinions, sentiments, and/or insights that may require transformation into quantifiable metrics for analytical purposes. For example, qualitative data may include textual data such as social media posts, customer reviews, feedback emails, open-ended survey responses, and/or the like. Further, qualitative data may include sentiment analysis, such as descriptions of customer experiences, opinions, and/or reactions, which are often qualitative in nature. In some cases, qualitative data may include descriptive information, such as qualitative reports, narratives, and/or articles discussing a financial event, company performance, and/or market conditions.

In continued reference to FIG. 1, in an embodiment, the conversion of qualitative data into quantitative metrics may include applying techniques that extract measurable values and/or indicators from qualitative information. This may include, for example, NLP techniques, text analysis, and/or machine-learning models.

In an embodiment, the conversion of qualitative data may include sentiment analysis, wherein sentiment analysis may include analyzing text to assign a sentiment score to quantify how positive, negative, and/or neutral the content is. For example, a customer review that says, "The service was excellent!" could be converted into a positive sentiment score, such as +0.9. Whereas a news article describing a company's financial troubles may be assigned a negative sentiment score, such as −0.8.

In some cases, conversion of qualitative data may include topic modeling, wherein topic modeling identifies themes and/or topics from a body of text and then assigns numeric values of the importance of each topic.

Further, in some cases, at least a processor 108 may use NLP techniques to classify text into predefined categories. For example, predefined categories may include, without limitation, "interest rates," "market volatility," "inflation," and/or the like. The resulting categories may be numeric and allow for the analysis of large datasets. For example, a blog post may be classified as "positive" (1), "negative" (−1), or "neutral" (0).

In some cases, at least a processor 108 may use Named Entity Recognition (NER), which may involve identifying entities such as companies, products, and/or locations within text and assigning a quantitative value based on their occurrences, importance, and/or relevance to the context. For example, a financial report may mention companies such as APPLE or TESLA. At least a processor 108 may count the frequency of mentions and quantify how much attention these entities are receiving in the text.

Further, in some cases, at least a processor 108 may be configured to recognize emotion within text and/or speech data. This may be accomplished by analyzing the text or speech data to detect underlying emotions, which may then be converted into numeric scores representing the intensity of these emotions. For example, a negative customer review expressing frustration may be converted into a numeric value of "frustration" intensity, such as an 0.8 on a 1-10 scale.

With continued reference to FIG. 1, in an embodiment, parsing relevant content 154 into a uniform format using a language processing module 160, wherein the language processing module 160 includes a data acquisition module, a named entity recognition module, and a metric conversion module. The data acquisition module may be configured to receive unstructured qualitative data and preprocess the unstructured qualitative data by performing at least one of tokenization, stopword removal, stemming, lemmatization, and/or sentence segmentation. Because qualitative data often consists of free-form text, it may require preprocessing before meaningful insights can be extracted. This preprocessing step involves applying natural language processing (NLP) techniques that standardize, clean, and structure the data for downstream processing. This may for example, include tokenization, which involves breaking down text into smaller units such as words, phrases, or sentences. Tokenization may ensure that at least a processor 108 may analyze individual linguistic components rather than processing entire text blocks as a whole. For example, the sentence "The Federal Reserve increased interest rates by 0.5%." may be tokenized into separate words like ["The", "Federal", "Reserve", "increased", "interest", "rates", "by", "0.5", "%"]. Tokenization may be foundational because it enables subsequent NLP operations, such as part-of-speech tagging and named entity recognition.

Continuing to reference FIG. 1, in an embodiment, another preprocessing step may include stopword removal, which filters out common words that do not contribute significant meaning to the analysis. Words such as "the," "is," "and," "of," and "in" typically add little value in financial analysis but may introduce noise into machine learning models. By removing these stopwords, at least a processor 108 may improve efficiency and ensure that only the most relevant words contribute to subsequent processing.

In further reference to FIG. 1, in an embodiment, the preprocessing step may include stemming and lemmatization, which are two techniques that may be used to reduce words to their base or root forms. Stemming may involve cutting off word suffixes to normalize variations of a word. For example, words like "investing," "invested," and "investment" may be stemmed down to "invest." However, stemming can sometimes produce incomplete or incorrect root words. To address this, the data acquisition module may use lemmatization, which may consider the context and grammar of a word before reducing it to its base form. Unlike stemming, lemmatization may rely on a lexical database to ensure proper word transformation. For instance, the words "ran" and "running" would be correctly lemmatized to "run" instead of incorrect stems like "runn." In the context of financial analysis, lemmatization may ensure that key financial terms are preserved in a meaningful way.

In continued reference to FIG. 1, in an embodiment, another preprocessing technique may include sentence segmentation, which may divide long text passages into individual sentences for more granular analysis. In financial documents, sentences may contain distinct and independent insights, so separating them may allow at least a processor 108 to assess each statement independently. For instance, in an earnings report, the sentence "Revenue increased by 10%. Operating expenses were reduced by 5%." consists of two separate financial insights. By segmenting these statements, at least a processor 108 may ensure that each piece of information is appropriately categorized and analyzed.

By performing these preprocessing tasks, tokenization, stopword removal, stemming, lemmatization, and sentence segmentation, the data acquisition module may prepare unstructured qualitative data for further feature extraction, classification, and/or sentiment analysis. These transformations may help ensure that at least a processor 108 can extract meaningful patterns, detect financial trends, and facilitate data-driven decision-making with increased accuracy and efficiency.

With further reference to FIG. 1, in an embodiment, the named entity recognition module may be configured to identify predefined entities within the unstructured qualitative data and extract numerical expressions form the unstructured qualitative data and associate the numerical expressions with corresponding predefined entities. "Named entity recognition," as used herein, is an NLP technique that allows a system to detect and classify entities such as company names, financial instruments, economic indicators, risk factors, and market events. By structuring this data, at least a processor 108 may enhance its ability to analyze and draw insights from raw textual sources such as financial reports, earnings call transcripts, news articles, regulatory filings, and market commentary.

In continued reference to FIG. 1, in an embodiment, a function of the NER module may include its ability to not only identify textual entities but also extract numerical expressions from the unstructured data and correctly associate these values with their respective entities. This may ensure that key financial metrics, such as stock prices, revenue figures, percentage changes, and financial ratios, are linked to the proper company, asset, or economic indicator. For example, in the sentence: "Tesla Inc. reported a 15% increase in revenue, reaching $24.3 billion in Q4 2023," the NER module may extract: "Tesla Inc." as the company entity, "15%" as the revenue growth percentage, "$24.3 billion" as the revenue value, and "Q4 2023" as the timeframe. Once extracted, at least a processor 108 may ensure that these values are contextually assigned within a structured format, which can then be used for further financial analysis, trend detection, and/or risk assessment.

With further reference to FIG. 1, in an embodiment, if multiple numerical expressions exist within a document, the NER module may apply contextual association algorithms to correctly map figures to their respective entities. This may prevent misinterpretations, such as incorrectly linking revenue figures from one company to another mentioned in the same text. Additionally, the NER module may be capable of handling complex financial expressions that include multipart references, such as comparative statements, such as "Amazon's revenue outpaced Microsoft's by 12% last quarter," conditional statements, such as "If inflation rises above 5%, the Federal Reserve may increase interest rates," and temporal variations, such as "Netflix saw a 20% year-over-year subscriber increase."

In continued reference to FIG. 1, in an embodiment, to improve accuracy, the NER module may in some cases, leverage machine learning models, domain-specific lexicons, and/or contextual embeddings trained on large datasets of financial and economic text. Additionally, the NER module may integrate sentiment analysis to determine whether a numerical expression has a positive, neutral, or negative connotation, helping analysts and decision-makers understand the potential impact of extracted financial data. By structuring qualitative financial data into well-defined entities and numerical associations, the NER module may enable at least a processor 108 to generate actionable insights, enhance financial modeling, and improve automated decision-making, particularly in fields such as investment analysis, risk management, and market forecasting.

Still referring to FIG. 1, in an embodiment, the metric conversion module may be configured to apply predefined weighting factors to sentiment scores and numerical expressions to normalize extracted qualitative data into quantifiable metrics and generate a structured output including at least one or risk scores, confidence ratings, and/or performance indicators as a function of the weighted sentiment scores and numerical expressions. The metric conversion module may ensure that financial insights derived from unstructured data sources, such as earnings reports, financial news, and market analysis, are converted into meaningful numerical representations that can be used for risk assessment, decision-making, and predictive analytics. In an embodiment, the metric conversion module may achieve this by applying predefined weighting factors to both sentiment scores and numerical expressions, enabling it to normalize data and produce standardized financial indicators.

With further reference to FIG. 1, in an embodiment, a first function of the metric conversion module may involve assigning weightings to sentiment scores, which are extracted from qualitative text sources. As used herein, "sentiment scores" are scores that quantify the positive, negative, or neutral nature of financial discussions, such as an earnings call or a market analysis report. For instance, a CEO stating that "growth is expected to slow in the coming quarters" may yield a negative sentiment score, whereas "strong revenue gains will continue into next year" may generate a high positive sentiment score. However, not all sentiment-bearing statements may have the same level of impact. To improve accuracy, the metric conversion module may apply predefined weighting factors that adjust the sentiment score based on contextual importance, the credibility of the source, and historical correlations with actual financial outcomes. For example, sentiment from a high-authority financial institution like the Federal Reserve or a CEO's earnings call may be weighted more heavily than an anonymous social media post.

Continuing to reference FIG. 1, in addition to sentiment scores, the metric conversion module may also process numerical expressions extracted from financial text. These numerical expressions may include profit margins, stock price fluctuations, revenue growth rates, interest rates, inflation figures, and more. In an embodiment, at least a processor 108 may ensure that these numerical values are normalized to standardized formats, making them comparable across different data sources and time periods. For example, if financial data is reported in varying currencies or different timeframes, for example, quarterly vs. yearly, the metric conversion module may convert, scale, and align these figures to ensure meaningful comparisons.

With continued reference to FIG. 1, once both sentiment scores and numerical expressions have been weighted and normalized, the metric conversion module may aggregate the data into structured financial outputs, such as risk scores, confidence ratings, and/or performance indicators. A risk score may quantify the likelihood of financial instability or investment volatility based on extracted data. A confidence rating could assess the reliability of a financial prediction based on historical accuracy, data completeness, or the credibility of the sources. A performance indicator might evaluate an asset's future growth potential based on weighted financial metrics and sentiment trends. For example, suppose a company's earnings report contains both positive sentiment language and strong revenue growth figures. The metric conversion module may assign high weights to these factors, generating a high confidence rating for continued financial success. Conversely, if a company's financial disclosures contain negative sentiment coupled with declining revenue and high debt ratios, the metric conversion module may compute a high-risk score, signaling potential instability.

By leveraging predefined weighting models, normalization techniques, and structured output generation, the metric conversion module may ensure that extracted qualitative data is transformed into actionable, quantifiable insights. This process may allow financial analysts, risk management systems, and automated decision-making platforms to interpret financial data with higher accuracy and reliability, ultimately improving investment strategies, corporate forecasting, and market intelligence applications.

In continued reference to FIG. 1, in an embodiment, parsing relevant content 154 may include using a language processing module 160. Language processing module 160 may include any hardware and/or software module. Language processing module 160 may be configured to extract from the relevant content 154, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 160 may operate to produce a language processing model. A language processing model may include a program automatically generated by computing device and/or language processing module 160 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to 1, language processing module 160 and/or diagnostic engine may generate the language processing model by any suitable method, including without limitation a natural language processing classification algorithm; language processing model may include a natural language process classification model that enumerates and/or derives statistical relationships between input terms and output terms. An algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that may be applied to the models. In such models, a hidden state to be estimated may include an association between extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 160 may combine two or more approaches. For instance, and without limitation, machine-learning programs may use a combination of Naive-Bayes (NB), Stochastic Gradient Descent (SGD), and parameter grid-searching classification techniques; the result may include a classification algorithm that returns ranked associations.

Alternatively, and/or additionally, and with continued reference to FIG. 1, language processing module 160 may be produced using one or more large language models (LLMs) 164. A "large language model," as used herein, is a deep learning data structure that can recognize, summarize, translate, predict and/or generate text and other content based on knowledge gained from massive datasets. Large language models 164 may be trained on large sets of data. Training sets may be drawn from diverse sets of data such as, as non-limiting examples, novels, blog posts, articles, emails, unstructured data, electronic records, and the like. In some embodiments, training sets may include a variety of subject matters, such as, as nonlimiting examples, medical report documents, electronic health records, entity documents, business documents, inventory documentation, emails, user communications, advertising documents, newspaper articles, and the like. In some embodiments, training sets of LLM 164 may include information from one or more public or private databases. As a non-limiting example, training sets may include databases associated with an entity. In some embodiments, training sets may include portions of documents associated with the electronic records correlated to examples of outputs. In an embodiment, LLM 164 may include one or more architectures based on capability requirements of LLM 164. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability, such as generative, contextual, or other specific capabilities.

With continued reference to FIG. 1, in some embodiments, LLM 164 may be generally trained. As used in this disclosure, a "generally trained" LLM is an LLM that is trained on a general training set comprising a variety of subject matters, data sets, and fields. In some embodiments, LLM 164 may be initially generally trained. Additionally, or alternatively, LLM 164 may be specifically trained. As used in this disclosure, a "specifically trained" LLM is an LLM that is trained on a specific training set, wherein the specific training set includes data including specific correlations for the LLM to learn. As a non-limiting example, LLM 164 may be generally trained on a general training set, then specifically trained on a specific training set. In an embodiment, specific training of LLM 164 may be performed using a supervised machine learning process. In some embodiments, generally training LLM 164 may be performed using an unsupervised machine learning process. As a non-limiting example, specific training set may include information from a database 120. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as LLM 164 may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as LLM 164 may include fine-tuning the pretrained model using Low-Rank Adaptation (LoRA). As used in this disclosure, "Low-Rank Adaptation" is a training technique for large language models 164 that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments LLM 164 may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. LLM 164 may include a text prediction-based algorithm configured to receive an article and apply a probability distribution to the words already typed in a sentence to work out the most likely word to come next in augmented articles. For example, if some words that have already been typed are "Nice to meet", then it may be highly likely that the word "you" will come next. LLM 164 may output such predictions by ranking words by likelihood or a prompt parameter. For the example given above, LLM 164 may score "you" as the most likely, "your" as the next most likely, "his" or "her" next, and the like. LLM 164 may include an encoder component and a decoder component.

Still referring to FIG. 1, LLM 164 may include a transformer architecture. In some embodiments, an encoder component of LLM 164 may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, LLM 164 and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanisms may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM 164 may predict the next word by searching for a set of positions in a source sentence where the most relevant information is concentrated. LLM 164 may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanisms may include, without limitation, generalized attention self-attention, multi-head attention, additive attention, global attention, and the like. In generalized attention, when a sequence of words or an image is fed to LLM 164, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM 164 may pick up particular parts at different positions in the input sequence and over time compute an initial composition of the output sequence. In multi-head attention, LLM 164 may include a transformer model of an attention mechanism. Attention mechanisms, as described above, may provide context for any position in the input sequence. For example, if the input data is a natural language sentence, the transformer does not have to process one word at a time. In multi-head attention, computations by LLM 164 may be repeated over several iterations, each computation may form parallel layers known as attention heads. Each separate head May independently pass the input sequence and corresponding output sequence element through a separate head. A final attention score may be produced by combining attention scores at each head so that every nuance of the input sequence is taken into consideration. In additive attention (Bahdanau attention mechanism), LLM 164 may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM 164 may either attend to all source words or predict the target sentence, thereby attending to a smaller subset of words.

With continued reference to FIG. 1, multi-headed attention in encoder may apply a specific attention mechanism called self-attention. Self-attention allows models such as LLM 164 or components thereof to associate each word in the input, to other words. As a non-limiting example, LLM 164 may learn to associate the word "you", with "how" and "are". It's also possible that LLM 164 learns that words structured in this pattern are typically a question and to respond appropriately. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiments, decoder may be stacked N layers high, with each layer taking in inputs from the encoder and layers before it. Stacking layers may allow LLM 164 to learn to extract and focus on different combinations of attention from its attention heads.

With continued reference to FIG. 1, LLM 164 may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with plurality of primary data 124 and/or plurality of secondary data 136.

With continued reference to FIG. 1, LLM 164 may generate at least one annotation as an output. At least one annotation may be any annotation as described herein. In some embodiments, LLM 164 may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module 160 may use a corpus of documents to generate associations between language elements in a language processing module 160, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface (GUI) 188, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in an embodiment, ensuring consistent structuring of quantitative data may involve transforming numerical and/or measurable data into a standardized format. In an embodiment, transforming numerical and/or measurable data into a standardized format may include standardization, normalization, categorization and aggregation, time series formatting, and missing data handling. Standardization may involve transforming data to ensure it follows a common format or scale. For example, standardization may include currency normalization, which may include converting figures into a common currency for easier comparison. In one or more embodiments, standards for currency normalization, such as which currency at least a processor 108 normalizes all currency to, may be adjustable by a user based on their preferences and/or geographic location. Normalization may include adjusting the values of quantitative data to fall within a specific range, such as 0 and 1, to make comparisons easier. For example, normalization may include normalizing stock prices over time, so that different companies' stocks may be compared despite differing price ranges. Categorization and aggregation may include grouping quantitative data in a certain way to ensure consistent structure. For example, sales data may be aggregated by product category and/or region. Alternatively, financial data such as quarterly revenues and/or yearly profits may need to be summed and/or averaged for easier understanding and/or comparison. If quantitative data involves time-based information, such as stock prices, sales data, economic indicators, and/or the like, it may need to be consistently structured over time. This may involve standardizing the time intervals, such as daily, monthly, etc., and/or ensuring that all data points are aligned with the correct date and time format. Further, at least a processor 108 may ensure that missing or incomplete quantitative data is dealt with in a consistent manner, such as filling in missing values with estimates, and/or removing incomplete records.

With further reference to FIG. 1, in an embodiment, at least a processor 108 may store the relevant content 154 in a database 120. In an embodiment, database 120 may include remote and/or local databases. Further, database 120 may include any database as described herein. In an embodiment, database 120 may include relational databases (SQL), Non-relational databases (NoSQL), time-series databases, graph databases, and/or the like.

In further reference to FIG. 1, in an embodiment, at least a processor 108 may be configured to continuously monitor the one or more data sources. In an embodiment, continuous monitoring may include several processes including but not limited to polling or listening to one or more data sources, data collection, real-time data processing and analysis, and/or decision making. At least a processor 108 may be configured to repeatedly query one or more data sources at fixed intervals to check for new information. For example, a stock trading system may poll a financial API every minute to check for price updates. Alternatively, and/or additionally, at least a processor 108 may listen for events using webhooks, message queues, and/or APIs that trigger updates. For example, a news aggregator may listen for new articles being published on a specific topic and trigger an update when new content appears. Once a change or an update is detected, at least a processor 108 may collect the new data. Further, at least a processor 108 may analyze the data in real time, applying algorithms or logic to interpret the newly collected data. For example, in a trading system, at least a processor 108 may analyze new stock prices and calculate indicators such as moving averages to assess market trends. Further event detection algorithms may be applied to identify specific patterns, trends, and/or anomalies, such as detecting a spike in trading volume, identifying a sentiment shift in social media posts, and/or the like. Once at least a processor 108 has monitored and analyzed the data, it may trigger one or more actions and/or decisions. For example, at least a processor 108 may automatically execute a buy or sell action if certain conditions are met, at least a processor 108 may trigger an alert or block access if suspicious activity is detected, and/or at least a processor 108 may update the list of recommended products based on new customer activity or data.

With further reference to FIG. 1, in an embodiment, at least a processor 108 may be configured to parse the plurality of primary data 124 into an associated category, wherein parsing the plurality of primary data 124 into an associated category includes fragmenting the plurality of primary data 124 into a plurality of instances and assigning the plurality of instances to a predefined category. In an embodiment, at least a processor 108 may be configured to parse not only plurality of primary data 124 into an associated category, but also plurality of secondary data 136. This process may allow at least a processor 108 to generate dynamic schema 176 based on the associations of plurality of primary data 124 and plurality of secondary data 136 and their relevance to an associated category. In an embodiment, parsing may include the process of analyzing and breaking down data into its component parts. For example, if the data includes a large set of financial records, parsing might involve extracting key details such as transaction amounts, dates, transaction types, and/or participants. If the data is textual, parsing may involve extracting individual sentences and/or keywords, identifying entities, and/or recognizing specific actions and/or intents in the text.

In further reference to FIG. 1, as used herein, "fragmenting" refers to the process of dividing data into smaller units, referred to as instances. These "instances," for purposes of this disclosure, are the individual elements or data points that make up the whole. Fragmentation may be a crucial step in enabling system 100 to focus on specific pieces of data rather than trying to handle everything at once. For example, textual data may be fragmented into individual sentences and/or phrases, and each sentence or phrase may become an instance that may be analyzed independently. For financial data, plurality of primary data 124 may consist of transaction records, which may be fragmented into individual transaction instances with specific attributes such as amount, date, and/or category.

With continued reference to FIG. 1, in an embodiment, after fragmenting plurality of primary data 124 into plurality of instances, at least a processor 108 may assign each instance of the plurality of instances to a specific predefined category. Categories may be used to group similar instances together, making it easier to analyze, report, and/or apply logic based on those groupings. In an embodiment, fragmenting plurality of primary data 124 into instances may further include normalizing the instances to a standard format, wherein normalizing the instances includes converting text to a consistent case, removing unwanted characters, and ensuring output instances are in a format that is consistent with the standard format.

In further reference to FIG. 1, in an embodiment, predefined categories may include four financial categories including a predefined protection category, a predefined savings category, a predefined wealth accumulation category, and a predefined asset management category. For purposes of this disclosure, a "predefined protection category" refers to a category grouped by its relation to mechanisms or strategies designed to safeguard assets, minimize financial risk, and preserve value in various financial activities. This may apply to both individual investors and/or financial institutions and may include a range of tools, strategies, and/or products used to mitigate potential losses and/or hedge against adverse financial events. For example, the plurality of instances that may be assigned to the protection category may include instances related to insurance, hedging, risk management, asset protection, financial products designed for protection, pension and retirement protection, regulatory protection, protection of financial stability, and/or the like.

With further reference to FIG. 1, as used herein, a "predefined savings category" refers to a category grouped by its relation to money that is set aside for future use, typically outside of regular day-to-day expenses, with the goal of preserving capital and providing financial security. The predefined category of savings may encompass broad financial data such as various types of funds or assets that individuals and/or entities intentionally reserve for future needs and/or emergencies. For example, and without limitation, plurality of instances that may be assigned to the predefined savings category may include data related to emergency savings, short-term savings, long-term savings, retirement savings, tax-advantaged savings, investment savings, automatic savings, savings for specific goals, and/or the like. In an embodiment, key features of the predefined savings category may include high liquidity, high security, interest/return ratios comparable to risk taken, and a purpose for future use.

Continuing to reference FIG. 1, as used throughout this disclosure, a "predefined wealth accumulation category" refers to a category grouped by its relation to the process of building and growing assets over time, with the goal of increasing an individual's or entity's net worth. This may include a plurality of instances related to various strategies, activities, and/or financial products that contribute to the growth of financial resources through saving, investing, and increasing the value of assets. In an embodiment, wealth accumulation may focus on long-term financial growth, taking into account factors such as compounding returns, strategic investments, and/or asset diversification.

In further reference to FIG. 1, as used herein, a "predefined asset management category" refers to a category grouped by its relation to the professional management of various types of assets on behalf of individuals, institutions, and/or entities. In an embodiment, types of assets may include, but are not limited to stocks, bonds, real estate, and/or other investments. The primary goal of asset management may be to maximize the value of these assets through strategic investment decisions, risk management, and portfolio diversification, while also ensuring that the assets align with the client's financial objectives, risk tolerance, and/or time horizon. For example, plurality of instances that may be assigned to the predefined asset management category may include data related to investment strategy development, portfolio construction and diversification, monitoring and rebalancing strategies, risk assessment and management, asset selection, client communication and reporting, fee structure, financial planning and tax optimization, and/or the like.

In continued reference to FIG. 1, in an embodiment, parsing plurality of primary data 124 and plurality of secondary data 136 into an associated category may include quantifying the distance between plurality of primary data 124 and a plurality of secondary data 136, which may include an intended financial goal. This process may involve, in some cases, computing a metric-based distance function, wherein the metric represents financial positioning within a given category and may be compared to an optimal or predefined benchmark for that category. In such an embodiment, at least a processor 108 may define category-specific financial metrics for each predefined financial category. These metrics may serve as quantifiable indicators of financial health. For example, for the protection category, relevant metrics may include risk exposure, insurance coverage adequacy, and the size of an emergency fund. The savings category may be assessed based on a savings rate, liquidity ratio, and withdrawal risk. Further, for wealth accumulation, key factors may include investment growth rate, net worth trajectory, and return on assets. Lastly, the asset management category may be evaluated through portfolio diversification index, asset allocation efficiency, and risk-adjusted returns. Establishing these metrics may ensure that financial data is consistently categorized and measurable.

Further referencing FIG. 1, once category-specific metrics are defined, at least a processor 108 may determine target benchmarks for each category. These benchmarks may be predefined based on financial best practices, dynamically adjusted using historical trends, and/or personalized according to user-defined financial goals. For example, an optimal liquidity ratio for the savings category might be set at 50%, while a well-diversified asset portfolio may require a specific allocation among equities, bonds, and alternative investments. The benchmarks may act as reference points against which real-time financial data is compared.

In continued reference to FIG. 1, with target benchmarks established, at least a processor 108 may compute a distance score to quantify the gap between a user's financial position and the ideal benchmark. This may be achieved using statistical and/or machine learning techniques such as Euclidean distance, cosine similarity, or custom weighting algorithms. For instance, if an individual's liquidity ratio is measured at 30%, while the recommended benchmark is 50%, the computed distance score would indicate a deficiency in savings adequacy. Similarly, if an investment portfolio lacks diversification and exceeds predefined risk thresholds, at least a processor 108 may flag this as a deviation from optimal asset management practices.

In further reference to FIG. 1, based on the computed distance scores, at least a processor 108 may generate corrective and/or proactive actions to help a user align with their financial goals. If the deviation is substantial, a corrective action may be prescribed, such as recommending an increase in monthly savings by 15% to meet retirement goals. Conversely, if a user is near the optimal benchmark, the system may suggest proactive adjustments, such as reallocating 10% of savings into investment-grade securities for higher returns. The prioritization of these actions may be determined by factors including urgency, financial impact, and/or user-specific constraints.

Continuing to reference FIG. 1, in an embodiment, to ensure ongoing accuracy and relevance, at least a processor 108 may incorporate a feedback loop and continuous optimization mechanism. As new plurality of primary data 124 and plurality of secondary data 136 is received over time, at least a processor 108 may recalculate distance scores, refine predictive models, and dynamically adjust its recommendations. Additionally, in an embodiment, by leveraging reinforcement learning models, at least a processor 108 can improve its recommendations based on observed user behavior and evolving financial market conditions. This may ensure that financial prescriptions remain adaptive, personalized, and aligned with real-time financial realities.

Still referring to FIG. 1, in an embodiment, one or more steps of parsing the plurality of primary data 124 and/or plurality of secondary data 136 into an associated category may be performed as a function of a classification model 168, wherein inputs into the classification model 168 include plurality of primary data 124, and outputs of the classification model 168 include a plurality of instances correlated to a predicted predefined category. In an embodiment, classification model 168 may include a classifier, wherein the classifier is trained using exemplary plurality of primary data 124 correlated to exemplary plurality of predefined categories. Further, in some embodiments, at least a processor 108 may implement a feature learning algorithm 172 or a clustering algorithm to accomplish more efficient and/or nuanced classifications.

A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristics may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in an embodiment, at least a processor 108 may be configured to map the plurality of primary data 124 to the plurality of secondary data 136. In an embodiment, mapping plurality of primary data 124 to plurality of secondary data 136 may include data transformation, data correlation, data categorization, data aggregation, feature extraction, and/or normalization or standardization. Some of these steps may occur at earlier junctions in the process, such as when the data is being collected and/or stored. In an embodiment, mapping plurality of primary data 124 to plurality of secondary data 136 may include feature extraction, in some cases using a feature learning algorithm 172, applied to plurality of secondary data 136. Following feature extraction, at least a processor 108 may categorize plurality of secondary data 136 in accordance with one or more predefined categories as discussed previously.

In an embodiment, mapping the plurality of primary data 124 to the plurality of secondary data 136 may include identifying significant relationships between the plurality of primary data 124 and the plurality of secondary data 136 using a statistical model. For example, a statistical model may include a feature learning algorithm 172 or a clustering algorithm. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm 172 may detect co-occurrences of elements of data, as defined above, with each other. As a non-limiting example, feature learning algorithm 172 may detect co-occurrences of elements, as defined above, with each other. Computing device 104 may perform a feature learning algorithm 172 by dividing elements or sets of data into various sub-combinations of such data to create new elements of data and evaluate which elements of data tend to co-occur with which other elements. In an embodiment, a first feature learning algorithm 172 may perform clustering of data.

Continuing to refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $$\text{argmin}_{ci \ni C} dist(ci, x)^2,$$

where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $$ci = 1/|Si| \sum xi \ni Si^{xi}.$$

K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between a elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively, or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

Still referring to FIG. 1, in an embodiment, at least a processor 108 may be configured to generate, as a function of mapping the plurality of primary data 124 to the plurality of secondary data 136, a dynamic schema 176. For purposes of this disclosure, a "dynamic schema" is a schema that can evolve or adjust as new data comes in or as the mapping between primary 124 and secondary data 136 changes. This adaptability allows system 100 to accommodate changing requirements, new data types, and/or shifts in how data should be structured. For example, if at least a processor 108 receives a new type of primary data 124, at least a processor 108 may adjust the dynamic schema 176 to integrate and accommodate this new data without needing a complete redesign.

In continued reference to FIG. 1, in an embodiment, generating dynamic schema 176 as a function of mapping plurality of primary data 123 to plurality of secondary data 136 may include identifying how specific financial metrics relate to corresponding financial goals. For example, an individual's investment growth rate may be mapped against their target net worth over a specified time horizon. If multiple financial metrics contribute to a single goal, at least a processor 108 may apply weighted mapping techniques to determine the relative importance of each factor. These relationships may be structured into an initial schema, where each primary data point is linked to a relevant benchmark and assigned a distance score, quantifying how far the current financial position deviates from the ideal state.

With continued reference to FIG. 1, in an embodiment, generating dynamic schema 176 may include establishing direct linkages between plurality of primary data points and their corresponding objectives. For example, an individual's investment growth rate is mapped against their target net worth over a specified time horizon using a growth projection formula: $P_t=P_0\times(1+r)^t$ where $P_t$ represents the projected portfolio value, $P_0$ is the current investment balance, r is the investment growth rate, and t is the time horizon. Similarly, other financial metrics, such as savings rate versus retirement targets and debt-to-income ratio versus creditworthiness benchmarks, may be mapped accordingly. In an embodiment, if multiple financial metrics contribute to a single goal, at least a processor 108 may apply weighted mapping techniques to determine the relative importance of each factor. A weight coefficient $w_i$ may be assigned to each contributing metric based on historical data correlations, expert-defined heuristics, or machine learning-based factor analysis. At least a processor 108 may then compute an overall impact score S for a financial goal using a weighted sum formula: $S=\Sigma\ w_i\times X_i$ where $X_i$ represents the standardized value of each contributing financial metric. This weighting process may ensure that high-impact factors receive greater emphasis in the schema.

In further reference to FIG. 1, following the weighting process, in an embodiment, at least a processor 108 may proceed with schema construction and distance scoring to quantify deviations from financial goals. Each primary data point may be programmatically linked to a relevant benchmark, and a distance score may be assigned to measure how far the current financial position deviates from the ideal state. The distance score D is calculated as: $D=|X_{current}-X_{target}|$ where $X_{current}$ represents the user's present financial metric, and $X_{target}$ is the benchmark goal. These relationships and distance scores may be stored in a structured format, such as a graph database or a relational database schema, allowing for efficient retrieval and analysis.

In continued reference to FIG. 1, in an embodiment, the structured format may include a financial blueprint format, wherein the financial blueprint format visually categorizes financial holdings and their respective distance scores across four main financial stages: Asset Management, Wealth, Savings, and Financial Protection. In an embodiment, each section may provide a clear snapshot of a client's financial standing while incorporating distance scores to highlight how far they are from their financial goals.

In an embodiment, the Asset Management Stage may categorize different types of investments and their respective distance scores, representing how far current holdings are from ideal benchmarks. It may include, without limitation, strategic asset allocation, where self-managed and institutionally managed assets are listed under specific investment types. These may include real estate holdings, displaying property values, equity positions, and/or any outstanding debt considerations. Additionally, business equity investments may be presented with their valuations and adjustments. Other categories in this section may include income, stocks, and funds, such as growth stocks, dividends, and/or ETFs, with details about unrealized gains and losses. Government and corporate bonds may be listed separately to track fixed-income holdings, while municipal bonds are highlighted for their tax-free benefits. Each of these investment categories may be assigned a distance score, quantifying how closely the client's portfolio aligns with the target asset allocation.

In an embodiment, the Wealth Stage may focus on tax treatment and liquidity, presenting holdings that contribute to long-term financial goals. It may include pre-tax and after-tax investments, ensuring clients understand the tax implications of their assets. For instance, pre-tax deferred accounts such as 401(k) plans, IRAs, and pension funds may be categorized with their respective balances. After-tax free accounts, including Roth IRAs and tax-free municipal bonds, may be listed separately. The Wealth Stage section may also include U.S. savings bonds, treasuries, and certificates of deposit (CDs), providing details about fixed-term deposits, balances, and maturity dates. Money market accounts and credit union savings/checking accounts may be categorized as liquid holdings. Each financial product may be scored based on its contribution to retirement and long-term wealth-building goals, highlighting areas where additional savings may be needed.

In an embodiment, the Savings Stage may track safety nets and emergency funds, ensuring coverage for expected financial needs. Savings accounts and cash equivalents may be categorized based on liquidity, including emergency funds and short-term savings. A distance score may be assigned to indicate if emergency reserves meet the recommended three-to-six-month living expenses. The wills and trusts subsection may outline the documentation status of estate planning, indicating whether updates or legal reviews are required. Insurance coverages, including disability, life, car, and home insurance, may be listed along with their policy details and coverage amounts. Liability insurance, such as umbrella policies for rental properties or personal liability, may also be categorized. Each insurance and estate planning category may receive a score based on adequacy, ensuring the client is sufficiently protected against financial risks.

In an embodiment, the Financial Protection Stage (Foundation) may lay out risk mitigation measures and their completeness. Medical and long-term care insurance policies may be reviewed to assess coverage for healthcare expenses in retirement. Ownership structures may detail whether assets are held individually, jointly, or within a trust, ensuring proper legal and tax considerations. Additionally, umbrella liability insurance may be evaluated for protection against significant financial risks. Each category within this section may receive a distance score, indicating gaps in financial protection and areas where additional coverage may be necessary.

Continuing to reference FIG. 1, in an embodiment, at least a processor 108 may automatically categorize financial data into one of these main sections. In an embodiment, distance scores may be calculated and color-coded for easy visualization. For example, green may indicate a distance score between 0% and 10%, which indicates close to target; yellow may indicate a distance score between 10% and 25%, which may indicate that it needs improvement; and red may indicate a distance score greater than 25%, which may indicate that it requires significant attention. In an embodiment, a structured PDF and/or interactive dashboard may be generated for client presentation. This format may visually represent gaps in financial planning, making it intuitive for clients to assess their financial position and identify areas needing improvement.

With further reference to FIG. 1, in an embodiment, dynamic schema 176 may evolve in response to new financial data and/or changes in mapping relationships. If at least a processor 108 detects an unrecognized data type, such as the introduction of cryptocurrency holdings or ESG risk factors, it may automatically adjust the schema to integrate this new data. At least a processor 108 may ensure that these modifications occur without requiring a full redesign, preserving consistency in data relationships while incorporating emerging financial trends. For instance, if a user starts tracking their crypto portfolio, at least a processor 108 may update dynamic schema 176 to include this metric within the wealth accumulation category, aligning it with other investment-related data points.

Still referring to FIG. 1, in an embodiment, to further enhance adaptability, at least a processor 108 may leverage machine learning algorithms to refine schema structures over time. For example, using unsupervised learning techniques such as clustering, at least a processor 108 may identify evolving financial patterns and adjust dynamic schema 176 mappings accordingly. If market conditions shift, causing inflation risk to have a greater impact on long-term financial planning, the schema may dynamically update to factor in inflation adjustments when evaluating financial goals. This may ensure that financial data remains relevant and accurately reflects real-world conditions.

In further reference to FIG. 1, in an embodiment, at least a processor 108 may also personalize schema modifications based on user-specific financial goals. If an individual decides to shift from a moderate to an aggressive investment strategy, the schema may adjust by increasing the target return rate, modifying risk tolerance thresholds, and/or reweighting asset allocation benchmarks. These adjustments may ensure that financial recommendations remain aligned with user preferences, even as investment strategies evolve.

With further reference to FIG. 1, in an embodiment, at least a processor 108 may be further configured to continuously update the dynamic schema 176 as a function of new plurality of primary data 124 and/or new plurality of secondary data 136 from one or more data sources, wherein continuously updating the dynamic schema 176 includes receiving new plurality of primary data 124 and/or new plurality of secondary data 136 from one or more data sources, updating the plurality of secondary data 136 as a function of the new plurality of secondary data 136, mapping the new plurality of primary data 124 to the updated plurality of secondary data 136, and generating, as a function of mapping the new plurality of primary data 124 to the updated plurality of secondary data 136, an updated dynamic schema. In an embodiment, at least a processor 108 may be configured to store, at a database 120, the dynamic schema 176 and its associated data. In some cases, historical versions may be stored for a period of time for use in comparisons over a span of time and/or as training data for one or more machine-learning models as described herein.

In continued reference to FIG. 1, a critical feature of the dynamic schema 176 may include its ability to update in real-time without disrupting operations. As modifications occur in the background, database structures, queries, and financial models may remain functional. API endpoints and reporting tools may seamlessly pull data from the updated schema without requiring manual intervention. This may ensure that financial insights and recommendations remain accurate and accessible at all times. Further, in an embodiment, to maintain long-term accuracy and scalability, dynamic schema 176 may incorporate continuous learning and optimization mechanisms. At least a processor 108 may regularly monitor financial trends, regulatory changes, and/or user behavior to refine mapping algorithms. Through reinforcement learning, at least a processor may improve its ability to assign financial data to appropriate categories, ensuring that insights remain relevant and actionable. This dynamic adaptability may allow system 100 to integrate new data types, refine classification models, and accommodate shifting financial objectives without requiring significant structural modifications. By leveraging real-time mapping, machine learning-driven schema evolution, and adaptive financial structuring, system 100 may ensure that financial data remains organized, interpretable, and actionable as conditions change. This dynamic schema 176 architecture may allow financial systems to operate with scalability, flexibility, and precision, providing users with continuously refined financial insights and recommendations.

With continued reference to FIG. 1, in an embodiment, at least a processor 108 may be configured to display, at a user interface 180, the dynamic schema 176. For purposes of this disclosure, a "user interface" refers to the space where interactions between a user and machines occur. In an embodiment, at least a processor 108 may be configured to display dynamic schema 176 at a display device 184. Display device 184 may include GUI 188, wherein GUI 188 is updated based on one or more user inputs. A "display device" refers to an electronic device that visually presents information to the entity. In some cases, display device 184 may be configured to project or show visual content generated by computers, video devices, or other electronic mechanisms. In some cases, display device 184 may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device 184 may be able to show any data elements and/or visual elements in various formats such as textural, graphical, video among others, in either monochrome or color. Display device 184 may include, but is not limited to, a smartphone, tablet, laptop, monitor, tablet, and the like. Display device 184 may include a separate device that includes a transparent screen configured to display computer generated images and/or information. In some cases, display device 184 may be configured to present a GUI 188 to a user, wherein a user may interact with the GUI 188. In some cases, a user may view a GUI 188 through display. Additionally, or alternatively, processor 108 may be connected to display device 184. In some embodiments, GUI 188 may be updated based on user inputs and the plurality of datasets. GUI 188 may use visual indicators, such as windows, icons, buttons, and menus, to facilitate user interaction. For example, without limitation GUI 188 may include visual elements, point-and-click interactions, windows and dialogs, consistency, feedback mechanisms, and/or the like.

A "GUI" is a visual interface that allows users to interact with electronic devices through graphical elements rather than text-based commands. Features of a GUI 188 may include, but are not limited to windows, icons, menus, buttons, sliders and controls, and/or any other graphical content configured to assist a user in interacting with an electronic device. As used in this context, "manipulation" refers to actions or interactions a user may perform to modify, control, or navigate through an interface. Such manipulations may require the use of input devices such as, but not limited to mouses, keyboards, and/or touchscreens. For example, manipulations may include clicking, dragging, scrolling, resizing, zooming, hovering, right-clicking, keyboard shortcuts, inputting data, removing data, and/or modifying data.

In continued reference to FIG. 1, in an embodiment, GUI 188 may include one or more event handlers. As used throughout this disclosure, "event handler" refers to functions or methods designed to respond to specific events in a program, particularly in user interface 180 contexts. An "event" is an occurrence that is detected by the program. For example, this may include a mouse click, keyboard input, and/or a change in a form field. In an embodiment, event handlers may include a listener and or binding process. A listener is a function that listens for specific events on an element. For instance, a button or an input field. A binding process is the process of associating an event with its handler. When an event occurs, an event object may be passed to the handler, containing details about the event. Event handlers allow for interactivity, modularity, and reusability. In such that, event handlers enable applications to respond dynamically to user actions, organize code by separating event handling logic from other program logic, and the same handler may be used for multiple elements and/or events. Further, in an embodiment, the feedback from an event handler may be utilized as training data in the training or retraining of models and/or modules as described here within.

In an embodiment, the user interface 180 may be configured to allow a user to modify the dynamic schema 176, wherein the dynamic schema 176 includes a test-case environment 190, and the test-case environment 190 enables the user to view a plurality of modifications of the plurality of primary data 124 and the plurality secondary data 136 and their effect on the dynamic schema 176. For purposes of this disclosure, a "test-case environment" is a feature of the dynamic schema 176 that allows a user to test out one or more modifications before applying changes. For example, a user may adjust plurality of primary data 124, such as amount saved each paycheck, and see how this may affect future savings and its exponential growth over time. This may also be applicable in cases where a user desires to introduce a new goal, such as saving for a child's education. These potential changes may be modeled to show the effect they have on dynamic schema 176 as a whole, prior to implementing any changes to the dynamic schema 176.

Figure 2:
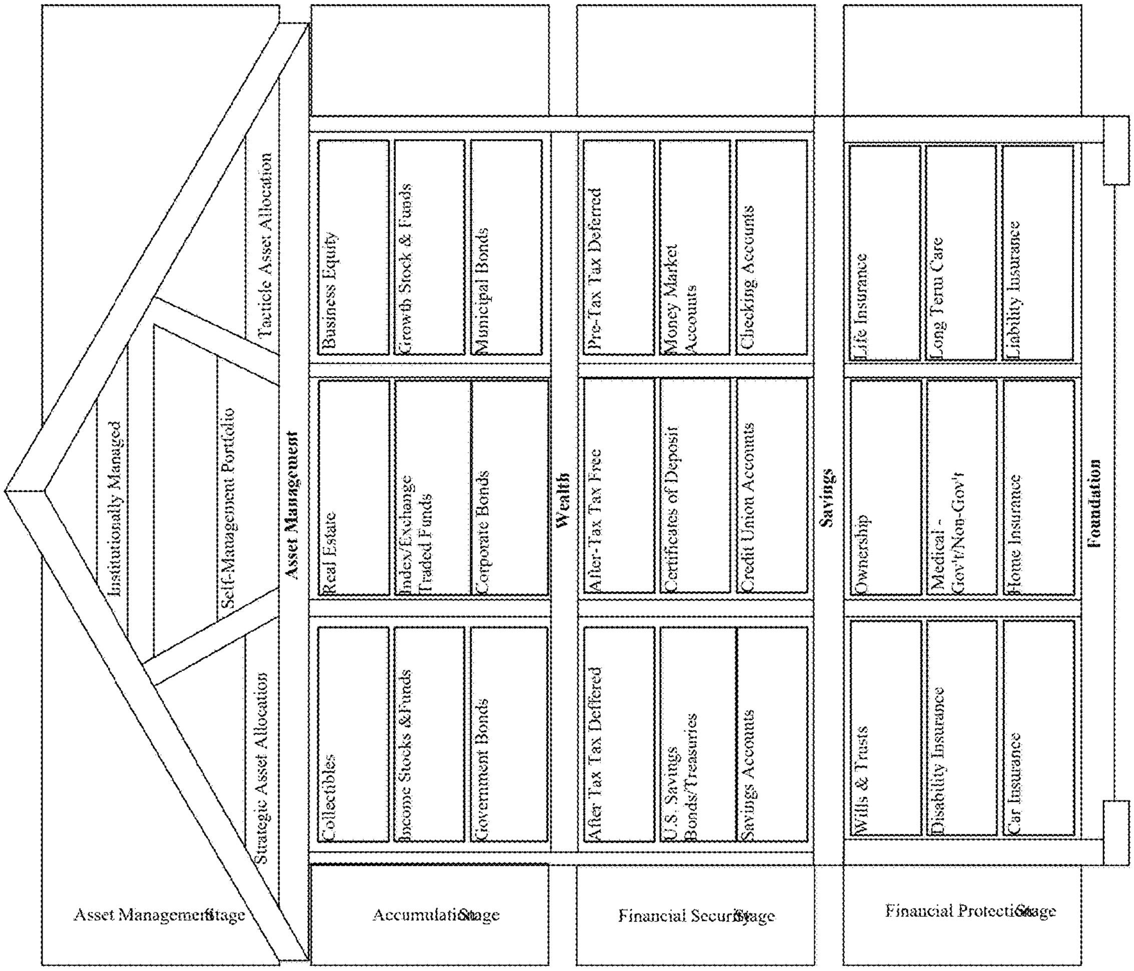
FIG. 2 is an exemplary illustration of a dynamic schema.

Referring now to FIG. 2, illustrated is an exemplary dynamic schema. In an embodiment, a dynamic schema may include a one-page financial game plan and client inventory card. The dynamic schema assists financial associates in understanding a client's current situation, promote strategic analytical conversations, and track future progress. In an embodiment, the dynamic schema may divide a client's "financial house" into areas of Protection, Savings, Wealth Accumulation, and Asset Management. Protection may focus on a client's assets, income, and the legacy for a client's future and heirs. In an embodiment, this may be represented as the foundation area of a client's financial house that requires safety and security. Savings may focus on how a client may create the savings to fund their current lifestyle and build the net worth and income they may need to support their future dreams. Wealth Accumulation may focus on the assets needed to enhance net worth, increase freedom, achieve independence, and create a legacy. Asset Management may focus on how the assets in each category should be dispersed. For example, a financial associate may aid a client in answering questions such as: should they be managed, self-managed, or institutionally managed, or should you just buy and hold? Further, in some cases asset management may aid a client in determining what type of security aligns with their preferences and goals. For example, this may include choosing between mutual funds, individual securities, exchange traded funds, or alternative investments, how they should be held, and how those assets should be allocated.

Figure 3:
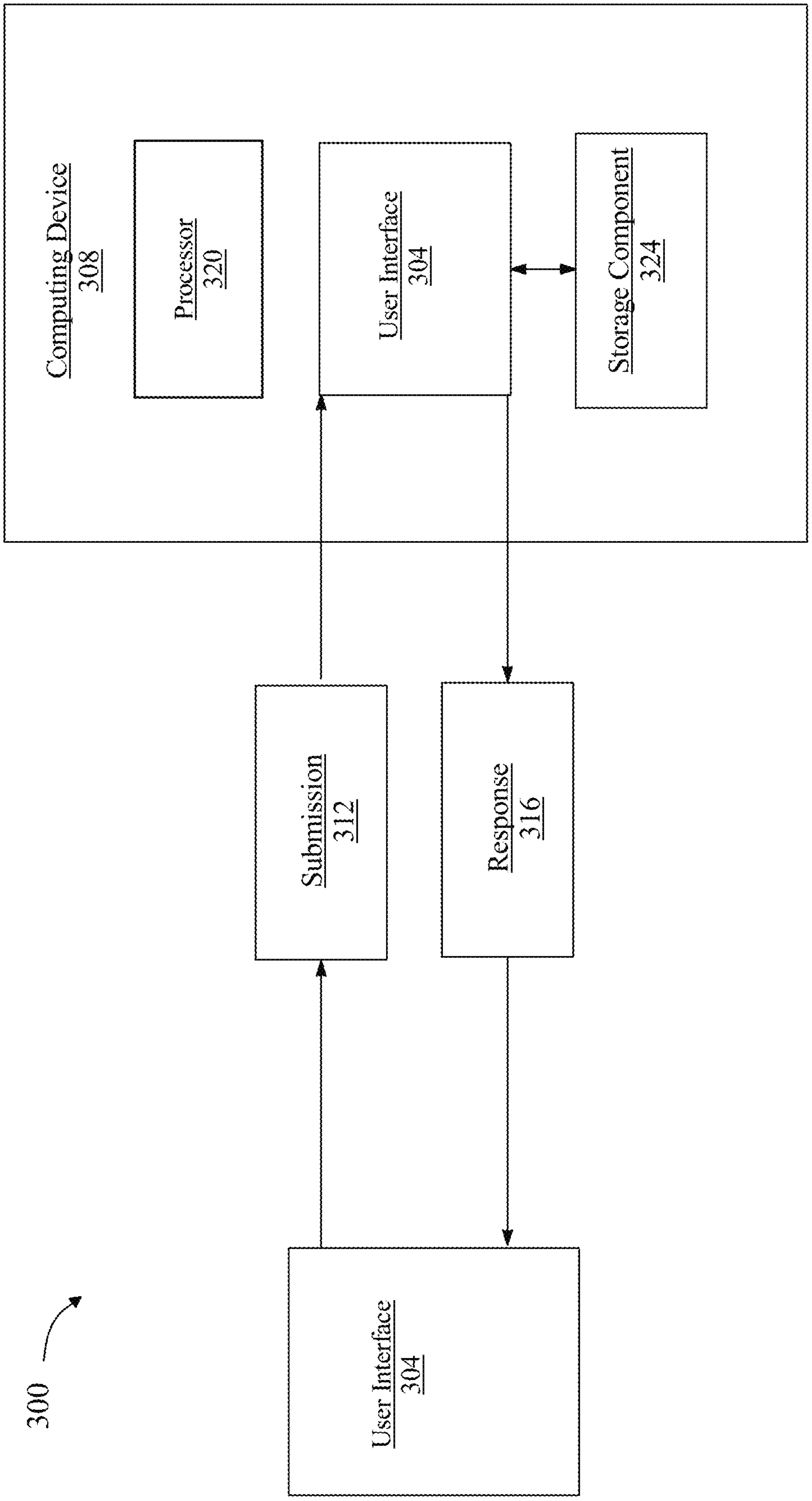
FIG. 3 is a schematic illustration of a chatbot system.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively, or additionally, in some cases, user interface 304 may remote to computing device 308 and communicative with the computing device 308, by way of one or more networks, such as without limitation the internet. Alternatively, or additionally, user interface 304 may communicate with user device using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 304 to the chatbot, and a response 316, from the chatbot to the user interface 304. In many cases, one or both of submission 312 and response 316 are text-based communication. Alternatively, or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 312 using one or more of keyword recognition, pattern matching, and natural language processing. In some embodiments, processor 320 employs real-time learning with evolutionary algorithms. In some cases, processor 320 may retrieve a pre-prepared response from at least a storage component 324, based upon submission 312. Alternatively, or additionally, in some embodiments, processor 320 communicates a response 316 without first receiving a submission 312, thereby initiating conversation. In some cases, processor 320 communicates an inquiry to user interface 304; and the processor 320 is configured to process an answer to the inquiry in a following submission 312 from the user interface 304. In some cases, an answer to an inquiry present within a submission 312 from a user device may be used by computing device 104 as an input to another function, for example without limitation as a modification of a dynamic schema.

Figure 4:
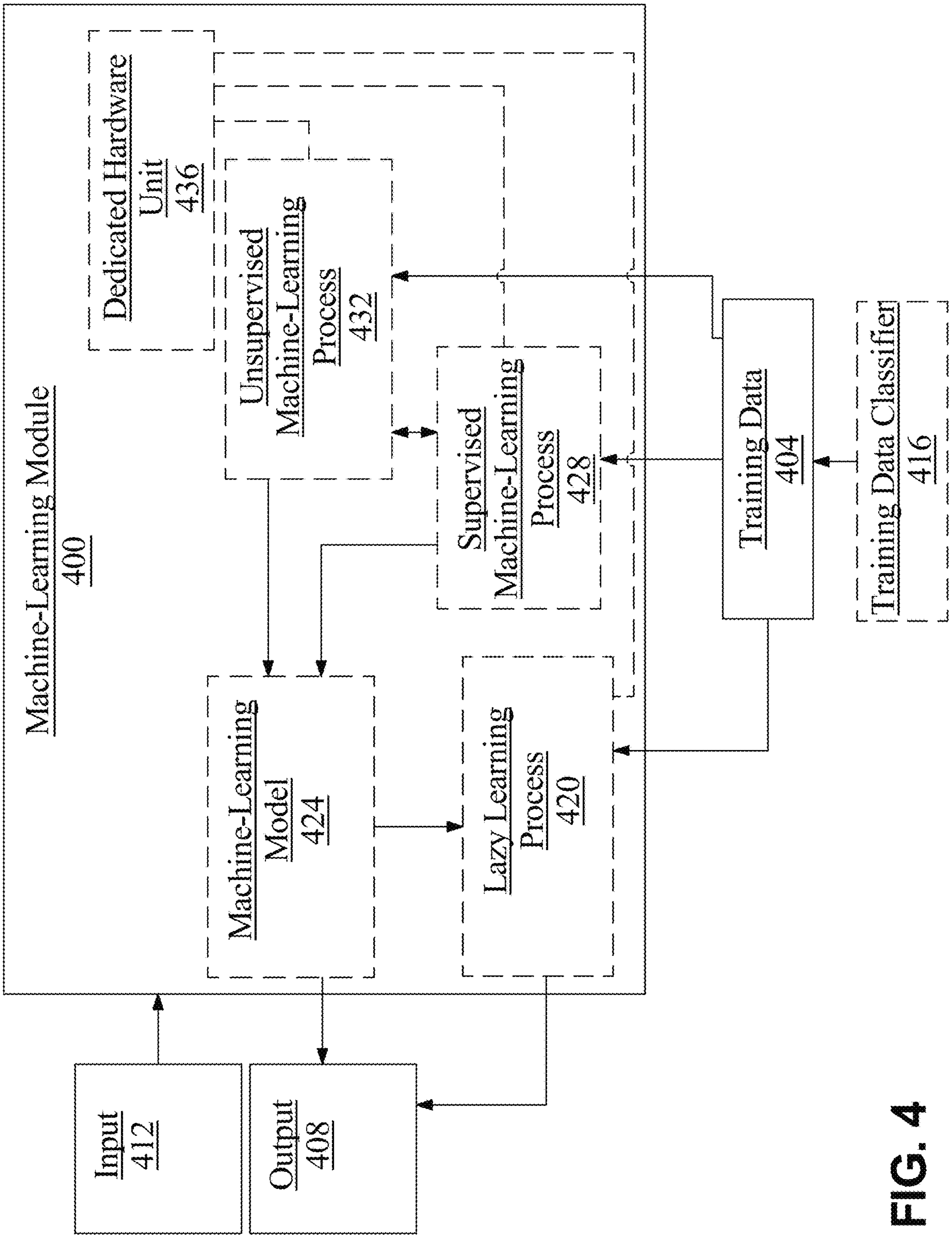
FIG. 4 is a block diagram of an exemplary embodiment of a machine learning model.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example input may include a plurality of primary data and/or a plurality of secondary data and outputs may include a categorized plurality of data.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to predefined categories such as protection, savings, wealth accumulation, and asset management.

Still referring to FIG. 4, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively, or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively, or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively, or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic “1” and “0” voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
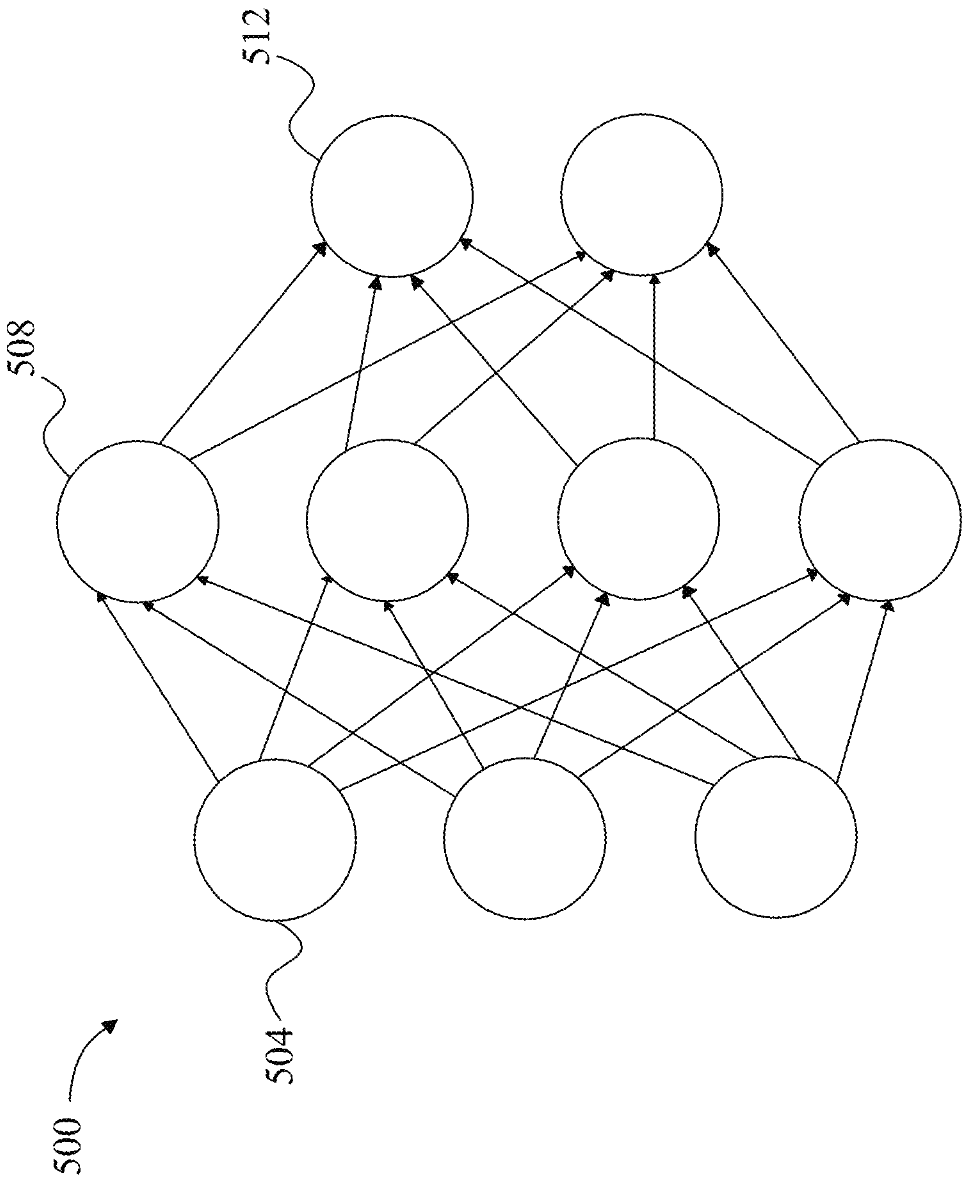
FIG. 5 is a schematic diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
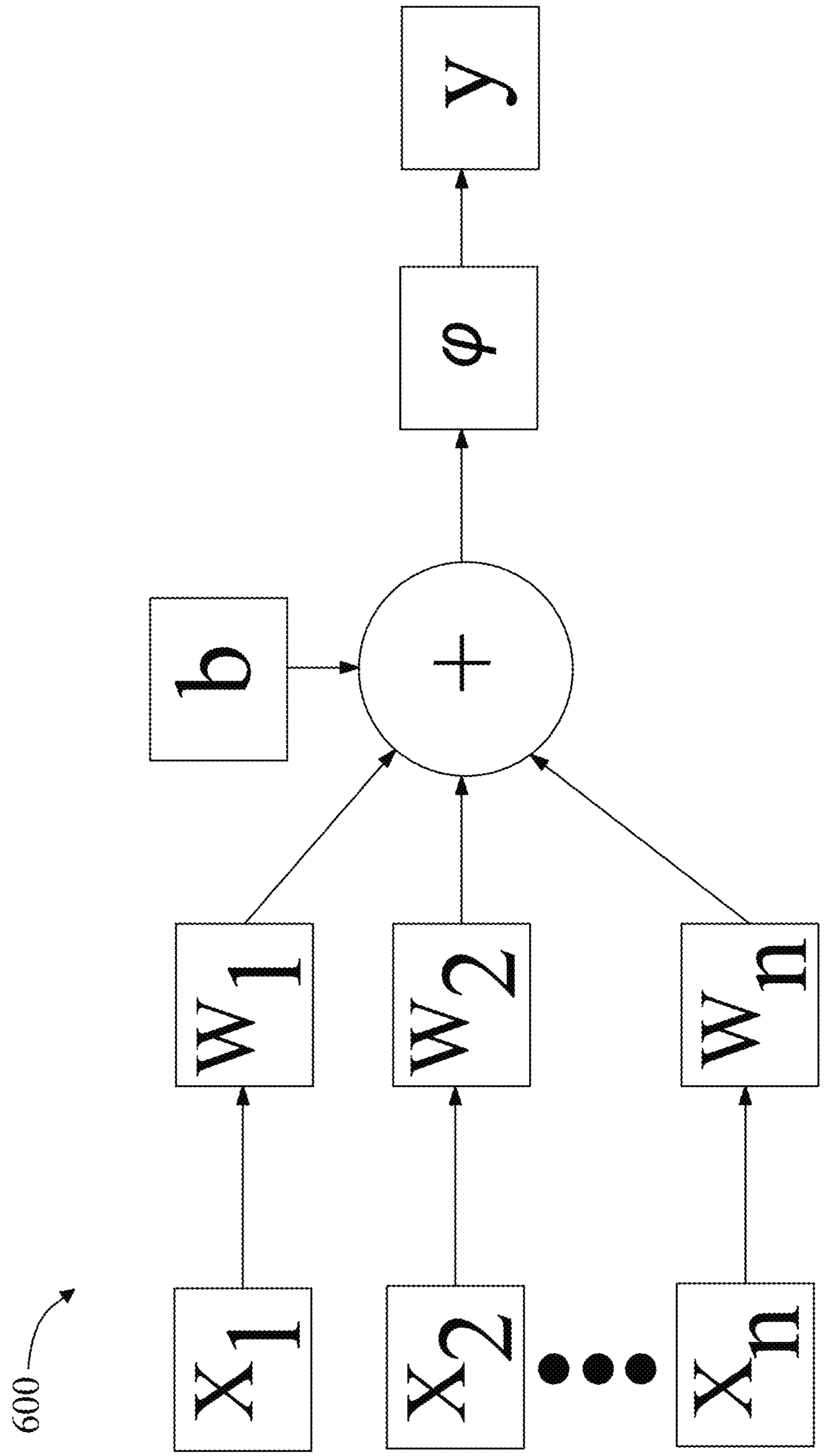
FIG. 6 is a schematic diagram of an exemplary embodiment of a neural network node.

Referring now to FIG. 6, an exemplary embodiment of a node 600 of a neural network is illustrated. A node may include, without limitation, a plurality of inputs xi that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as f(x)=tan $h^2$(x), a rectified linear unit function such as f(x)=max(0,x), a "leaky" and/or "parametric" rectified linear unit function such as f(x)=max (ax,x) for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
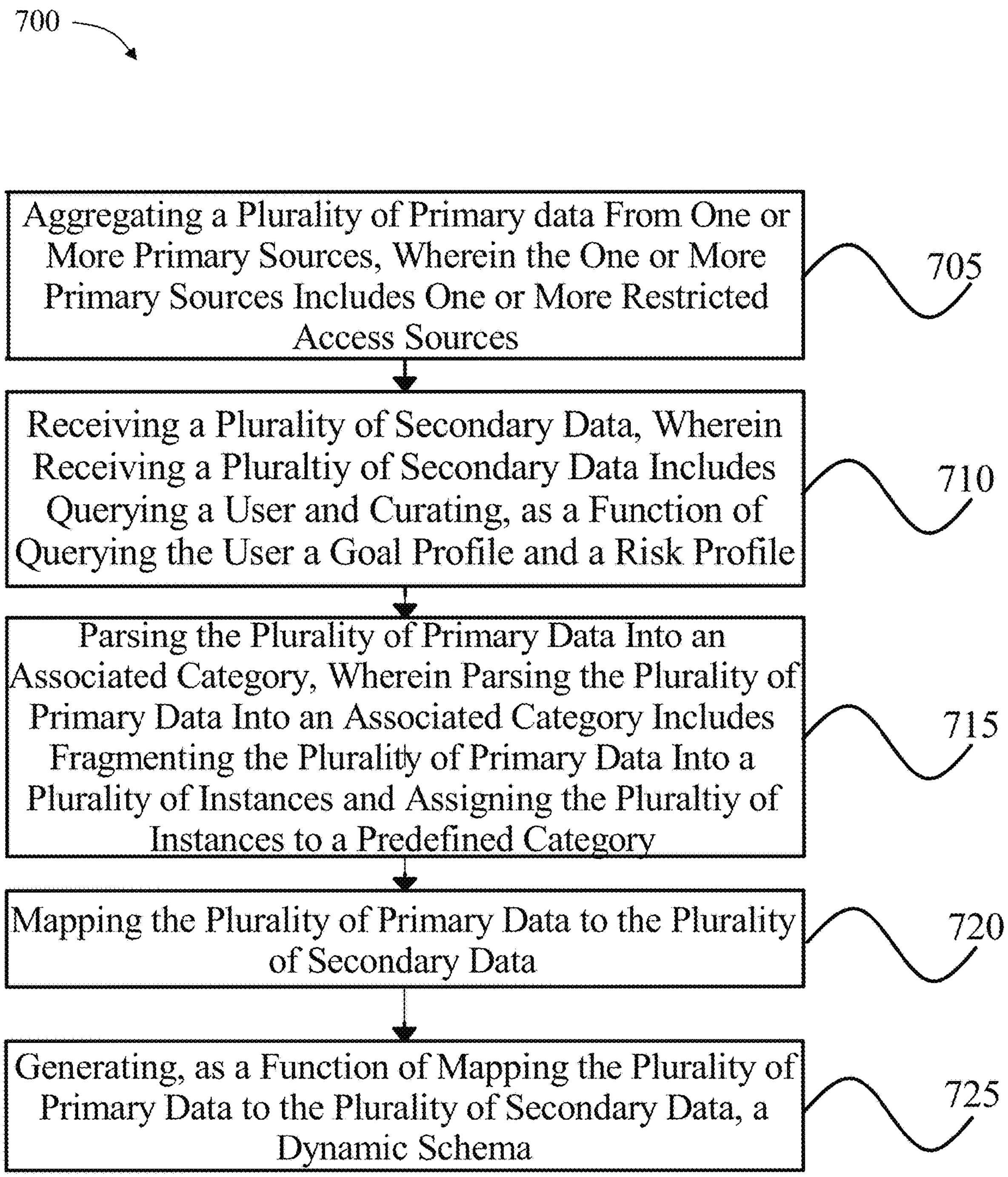
FIG. 7 is a flow diagram illustrating an exemplary method for data analysis and optimization for resource independence.

Referring now to FIG. 7, an exemplary method 700 for data analysis and optimization for resource independence is illustrated. Method 700 may include a step 705 of aggregating a plurality of primary data from one or more primary sources, wherein aggregating the one or more primary sources includes one or more restricted access sources. This may be implemented, without limitation, as referenced in FIGS. 1-6.

In continued reference to FIG. 7, method 700 may include a step 710 of receiving a plurality of secondary data, wherein receiving a plurality of secondary data includes querying a user, and curating, as a function of querying the user, a goal profile and a risk profile. In an embodiment, the plurality of secondary data may include one or more of user-provided data, historical data, and external data. Further, in an embodiment, external data may be received as a function of a web-crawler, wherein the web-crawler is configured to access one or more data sources, wherein the one or more data sources are related to the goal profile and the risk profile, identify relevant content as a function of a predefined criteria, wherein the predefined criteria includes keywords, phrases, and specific financial metrics that are indicative of potential risks, goal alignment, and shifts in market sentiment, extract the relevant content, wherein extracting the relevant content includes extracting both structured and unstructured data, parse the relevant content into a uniform format, wherein parsing the relevant content includes converting qualitative data into quantifiable metrics and ensuring consistent structuring of quantitative data, store the relevant content in a database, and continuously monitor the one or more data sources. This may be implemented, without limitation, as referenced in FIGS. 1-6.

With further reference to FIG. 7, method 700 may include a step 715 of parsing the plurality of primary data into an associated category, wherein parsing the plurality of primary data into an associated category includes fragmenting the plurality of primary data into a plurality of instances and assigning the plurality of instances to a predefined category. In an embodiment, fragmenting the plurality of primary data into instances may further include normalizing the instances to a standard format, wherein normalizing the instances includes converting text to a consistent case, removing unwanted characters, and ensuring output instances are in a format that is consistent with a standard format. Further, in some embodiments, parsing the plurality of primary data into an associated category may be performed as a function of a classification mode, wherein inputs into the classification model include the plurality of primary data and outputs of the classification model include a plurality of instances correlated to a predicted predefined category. This may be implemented, without limitation, as referenced in FIGS. 1-6.

In continued reference to FIG. 7, method 700 may include a step 720 of mapping the plurality of primary data to the plurality of secondary data. In an embodiment, mapping the plurality of primary data to the plurality of secondary data may include identifying significant relationships between the plurality of primary data and the plurality of secondary data using a statistical model. This may be implemented as referenced in FIGS. 1-6.

Still referring to FIG. 7, method 700 may include a step 725 of generating, as a function of mapping the plurality of primary data to the plurality of secondary data, a dynamic schema. In an embodiment, method 700 may further include continuously updating the dynamic schema as a function of new plurality of primary data and new plurality of secondary data, wherein continuously updating the dynamic schema includes receiving new plurality of primary data and new plurality of secondary data form one or more data sources, updating the plurality of secondary data as a function of the new plurality of secondary data, mapping the new plurality of primary data to the updated plurality of secondary data, and generating, as a function of mapping the new plurality of primary data to the updated plurality of secondary data, an updated dynamic schema. This may be implemented, without limitation, as referenced in FIGS. 1-6.

In continued reference to FIG. 7, method 700 may further include storing, at a database, the dynamic schema and its associated data. This may be implemented, without limitation, as referenced in FIGS. 1-6. Further, method 700 may further include displaying, at a user interface, the dynamic schema. In an embodiment, the user interface may be configured to allow a user to modify the dynamic schema, wherein the dynamic schema includes a test-case environment, and the rest-case environment enables the user to view a plurality of modification of the plurality of primary data and the plurality of secondary data and their effect on the dynamic schema. This may be implemented, without limitation, as referenced in FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
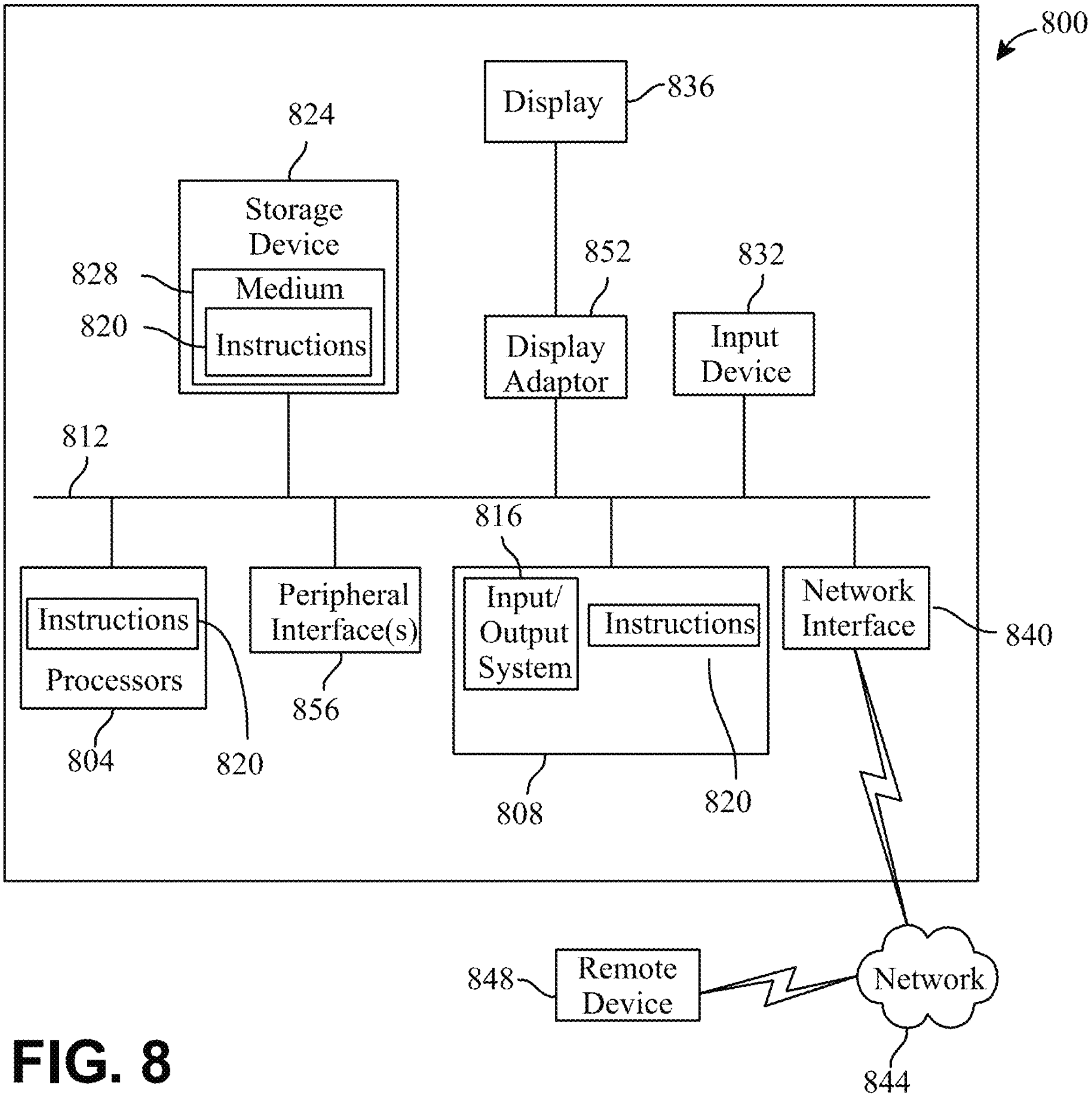
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for data analysis and optimization for resource independence, wherein the system comprises:

at least a processor; and a memory communicatively connected to the at least a processor, wherein the memory contains instructions configuring the at least a processor to:

aggregate a plurality of primary data from one or more primary sources, wherein the one or more primary sources comprise one or more restricted access sources;

output a client profile using a machine-learning model trained on received historical data, wherein the client profile comprises a predicted goal profile and a predicted risk profile;

receive a plurality of secondary data, wherein receiving a plurality of secondary data comprises:

querying a user as a function of the client profile; and curating, as a function of querying the user, a goal profile and a risk profile;

retrain the machine-learning model, wherein retraining the machine-learning model comprises:

comparing the predicted goal profile and the predicted risk profile to the goal profile and the risk profile; and retraining the machine-learning model as a function of at least a variation between the client profile determined as a function of the plurality of primary data and the plurality of secondary data;

parse the plurality of primary data into an associated category, wherein parsing the plurality of primary data into an associated category comprises:

fragmenting the plurality of primary data into a plurality of instances; and assigning the plurality of instances to a predefined category;

map the plurality of primary data to the plurality of secondary data; and generate, as a function of mapping the plurality of primary data to the plurality of secondary data, a dynamic schema.

2. The system of claim 1, wherein fragmenting the plurality of primary data into instances further comprises normalizing the instances to a standard format, wherein normalizing the instances comprises:

converting text to a consistent case;

removing unwanted characters; and ensuring output instances are in a format that is consistent with the standard format.

3. The system of claim 1, wherein parsing the plurality of primary data into an associated category is performed as a function of a classification model, wherein:

inputs into the classification model comprise the plurality of primary data; and outputs of the classification model comprise a plurality of instances correlated to a predicted predefined category.

4. The system of claim 1, wherein the plurality of secondary data comprises one or more of user-provided data, historical data, and external data.

5. The system of claim 4, wherein the external data is received as a function of a web-crawler, wherein the web-crawler is configured to:

access one or more data sources, wherein the one or more data sources are related to the goal profile and the risk profile;

identify relevant content as a function of a predefined criteria, wherein identifying relevant content as a function of a predefined criteria comprises:

assigning a relevance score to individual content using a weighted formula;

setting a threshold score to filter out low-relevance content; and ranking the scored individual content as a function of the relevance score;

extract the relevant content, wherein extracting the relevant content comprises extracting both structured and unstructured data; and parse the relevant content into a uniform format using a language processing module.

6. The system of claim 5, wherein the language processing module comprises:

a named entity recognition module, wherein the named entity recognition module is configured to:

identify predefined entities within unstructured qualitative data; and extract numerical expressions from the unstructured qualitative data and associate the numerical expressions with corresponding predefined entities; and a metric conversion module, wherein the metric conversion module is configured to:

apply predefined weighting factors to sentiment scores and numerical expressions to normalize extracted qualitative data into quantifiable metrics; and generate a structured output comprising at least one of risk scores, confidence ratings, and performance indicators as a function of the weighted sentiment scores and numerical expressions.

7. The system of claim 1, wherein mapping the plurality of primary data to the plurality of secondary data comprises identifying significant relationships between the plurality of primary data and the plurality of secondary data using a statistical model.

8. The system of claim 1, wherein at least a processor is further configured to continuously update the dynamic schema as a function of new plurality of primary data and new plurality of secondary data, wherein continuously updating the dynamic schema comprises:

receiving new plurality of primary data and new plurality of secondary data from one or more data sources;

updating the plurality of secondary data as a function of the new plurality of secondary data;

mapping the new plurality of primary data to the updated plurality of secondary data; and generating, as a function of mapping the new plurality of primary data to the updated plurality of secondary data, an updated dynamic schema.

9. The system of claim 1, wherein the at least a processor is further configured to display, at a user interface, the dynamic schema.

10. The system of claim 9, wherein the user interface is configured to allow a user to modify the dynamic schema, wherein:

the dynamic schema comprises a test-case environment; and the test-case environment enables the user to view a plurality of modifications of the plurality of primary data and the plurality of secondary data and their effect on the dynamic schema.

11. A method for data analysis and optimization for resource independence, wherein the method comprises:

aggregating a plurality of primary data from one or more primary sources, wherein the one or more primary sources comprise one or more restricted access sources;

outputting a client profile using a machine-learning model trained on received historical data, wherein the client profile comprises a predicted goal profile and a predicted risk profile;

receiving a plurality of secondary data, wherein receiving a plurality of secondary data comprises:

querying a user as a function of the client profile; and curating, as a function of querying the user, a goal profile and a risk profile;

retraining the machine-learning model, wherein retraining the machine-learning model comprises:

comparing the predicted goal profile and the predicted risk profile to the goal profile and the risk profile; and retraining the machine-learning model as a function of at least a variation between the client profile determined as a function of the plurality of primary data and the plurality of secondary data;

parsing the plurality of primary data into an associated category, wherein parsing the plurality of primary data into an associated category comprises:

fragmenting the plurality of primary data into a plurality of instances; and assigning the plurality of instances to a predefined category;

mapping the plurality of primary data to the plurality of secondary data; and generating, as a function of mapping the plurality of primary data to the plurality of secondary data, a dynamic schema.

12. The method of claim 11, wherein fragmenting the plurality of primary data into instances further comprises normalizing the instances to a standard format, wherein normalizing the instances comprises:

converting text to a consistent case;

removing unwanted characters; and ensuring output instances are in a format that is consistent with the standard format.

13. The method of claim 11, wherein parsing the plurality of primary data into an associated category is performed as a function of a classification model, wherein:

inputs into the classification model comprise the plurality of primary data; and outputs of the classification model comprise a plurality of instances correlated to a predicted predefined category.

14. The method of claim 11, wherein the plurality of secondary data comprises one or more of user-provided data, historical data, and external data.

15. The method of claim 14, wherein the external data is received as a function of a web-crawler, wherein the web-crawler is configured to:

access one or more data sources, wherein the one or more data sources are related to the goal profile and the risk profile;

identify relevant content as a function of a predefined criteria, wherein identifying relevant content as a function of a predefined criteria comprises:

assigning a relevance score to individual content using a weighted formula;

setting a threshold score to filter out low-relevance content; and ranking the scored individual content as a function of the relevance score;

extract the relevant content, wherein extracting the relevant content comprises extracting both structured and unstructured data; and parse the relevant content into a uniform format using a language processing module.

16. The method of claim 15, wherein the language processing module comprises:

a named entity recognition module, wherein the named entity recognition module is configured to:

identify predefined entities within unstructured qualitative data; and extract numerical expressions from the unstructured qualitative data and associate the numerical expressions with corresponding predefined entities; and a metric conversion module, wherein the metric conversion module is configured to:

apply predefined weighting factors to sentiment scores and numerical expressions to normalize extracted qualitative data into quantifiable metrics; and generate a structured output comprising at least one of risk scores, confidence ratings, and performance indicators as a function of the weighted sentiment scores and numerical expressions.

17. The method of claim 11, wherein mapping the plurality of primary data to the plurality of secondary data comprises identifying significant relationships between the plurality of primary data and the plurality of secondary data using a statistical model.

18. The method of claim 11, further comprising continuously updating the dynamic schema as a function of new plurality of primary data and new plurality of secondary data, wherein continuously updating the dynamic schema comprises:

receiving new plurality of primary data and new plurality of secondary data from one or more data sources;

updating the plurality of secondary data as a function of the new plurality of secondary data;

mapping the new plurality of primary data to the updated plurality of secondary data; and generating, as a function of mapping the new plurality of primary data to the updated plurality of secondary data, an updated dynamic schema.

19. The method of claim 11, further comprising displaying, at a user interface, the dynamic schema.

20. The method of claim 19, wherein the user interface is configured to allow a user to modify the dynamic schema, wherein:

the dynamic schema comprises a test-case environment; and the test-case environment enables the user to view a plurality of modifications of the plurality of primary data and the plurality of secondary data and their effect on the dynamic schema.

* * * * *